US008448056B2

(12) United States Patent
Pulsipher et al.

(10) Patent No.: US 8,448,056 B2
(45) Date of Patent: May 21, 2013

(54) VALIDATION ANALYSIS OF HUMAN TARGET

(75) Inventors: Jon D. Pulsipher, North Bend, WA (US); Parham Mohadjer, Redmond, WA (US); Nazeeh Amin ElDirghami, Redmond, WA (US); Shao Liu, Bellevue, WA (US); Patrick Orville Cook, Monroe, WA (US); James Chadon Foster, Redmond, WA (US); Ronald Omega Forbes, Jr., Seattle, WA (US); Szymon P. Stachniak, Kirkland, WA (US); Tommer Leyvand, Seattle, WA (US); Joseph Bertolami, Seattle, WA (US); Michael Taylor Janney, Sammamish, WA (US); Kien Toan Huynh, Redmond, WA (US); Charles Claudius Marais, Duvall, WA (US); Spencer Dean Perreault, Bellevue, WA (US); Robert John Fitzgerald, Kirkland, WA (US); Wayne Richard Bisson, Seattle, WA (US); Craig Carroll Peeper, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 336 days.

(21) Appl. No.: 12/972,341

(22) Filed: Dec. 17, 2010

(65) Prior Publication Data

US 2012/0159290 A1 Jun. 21, 2012

(51) Int. Cl.
*G06F 11/00* (2006.01)

(52) U.S. Cl.
USPC .......................... 714/819; 382/103; 348/169

(58) Field of Classification Search ... 714/819; 382/103; 348/169; 463/31
See application file for complete search history.

(56) References Cited

U.S. PATENT DOCUMENTS

| 4,288,078 A | 9/1981 | Lugo |
| 4,627,620 A | 12/1986 | Yang |

(Continued)

FOREIGN PATENT DOCUMENTS

| CN | 101254344 B | 6/2010 |
| EP | 0583061 A2 | 2/1994 |

(Continued)

OTHER PUBLICATIONS

Cai, Q. and J.K. Aggarwal. "Tracking Human Motion Using Multiple Cameras." Proceedings of the 13th International Conference on Pattern Recognition, Aug. 25-29, 1996, pp. 1-5, International Association for Pattern Recognition (IAPR), Vienna, Austria.

(Continued)

*Primary Examiner* — Marc Duncan
(74) *Attorney, Agent, or Firm* — Vierra Magen Marcus LLP

(57) ABSTRACT

Technology for testing a target recognition, analysis, and tracking system is provided. A searchable repository of recorded and synthesized depth clips and associated ground truth tracking data is provided. Data in the repository is used by one or more processing devices each including at least one instance of a target recognition, analysis, and tracking pipeline to analyze performance of the tracking pipeline. An analysis engine provides at least a subset of the searchable set responsive to a request to test the pipeline and receives tracking data output from the pipeline on the at least subset of the searchable set. A report generator outputs an analysis of the tracking data relative to the ground truth in the at least subset to provide an output of the error relative to the ground truth.

20 Claims, 22 Drawing Sheets

U.S. PATENT DOCUMENTS

| | | | |
|---|---|---|---|
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,380,933 B1 | 4/2002 | Sharir et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,372,977 B2 * | 5/2008 | Fujimura et al. ............... 382/103 |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |

| | | | |
|---|---|---|---|
| 7,684,592 | B2 | 3/2010 | Paul et al. |
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,019,801 | B1* | 9/2011 | Robb et al. .............. 707/899 |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 8,269,849 | B2* | 9/2012 | Simske et al. ............ 348/222.1 |
| 2005/0031166 | A1* | 2/2005 | Fujimura et al. ............ 382/103 |
| 2006/0104487 | A1 | 5/2006 | Porter et al. |
| 2006/0187305 | A1* | 8/2006 | Trivedi et al. ............... 348/169 |
| 2008/0026838 | A1 | 1/2008 | Dunstan et al. |
| 2008/0063236 | A1 | 3/2008 | Ikenoue et al. |
| 2008/0273751 | A1* | 11/2008 | Yuan et al. ................... 382/103 |
| 2008/0297587 | A1 | 12/2008 | Kurtz et al. |
| 2010/0007740 | A1* | 1/2010 | Greiffenhagen et al. ..... 348/169 |
| 2010/0142815 | A1* | 6/2010 | Sim .............................. 382/167 |
| 2010/0166260 | A1* | 7/2010 | Huang et al. ................. 382/103 |
| 2010/0322476 | A1* | 12/2010 | Kanhere et al. .............. 382/103 |
| 2011/0026770 | A1* | 2/2011 | Brookshire ................... 382/103 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Urtasun, Raquel, David J. Fleet and Pascal Fua. Temporal motion models for monocular and multiview 3D human body tracking. Computer Vision and Image Understanding, Nov. 2006, pp. 157-177, vol. 104, issue 2, Elsevier Science Inc., New York, NY, USA.

"Visual tracking."Wiki article [online], pp. 1-8. Retrieved from the Internet on May 4, 2010: URL: <http://psychology.wikia.com/wiki/Visual_tracking>.

Zhou, Jianpeng and Jack Hoang. "Real Time Robust Human Detection and Tracking System." Proceedings of the 2005 Institute of Electrical and Electronics Engineers Computer Society Conference on Computer Vision and Pattern Recognition (CVPR'05), Jun. 20-26, 2005, pp. 1-8. IEEE Computer Society, San Diego, CA, USA.

Toyama, Kentaro, et al., "Probabilistic Tracking in a Metric Space," Eighth International Conference on Computer Vision, Vancouver, Canada, vol. 2, Jul. 2001, 8 pages.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

* cited by examiner

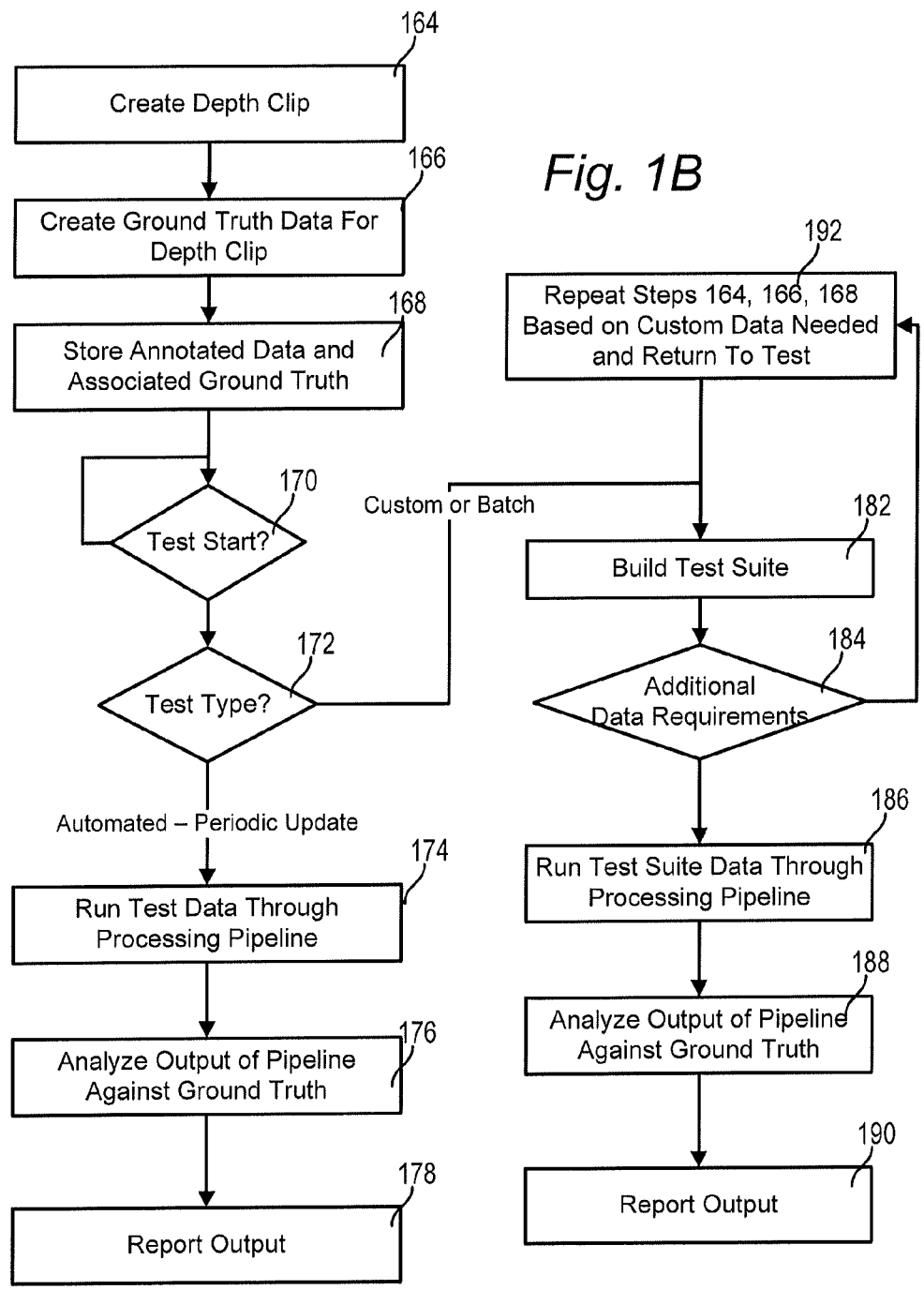

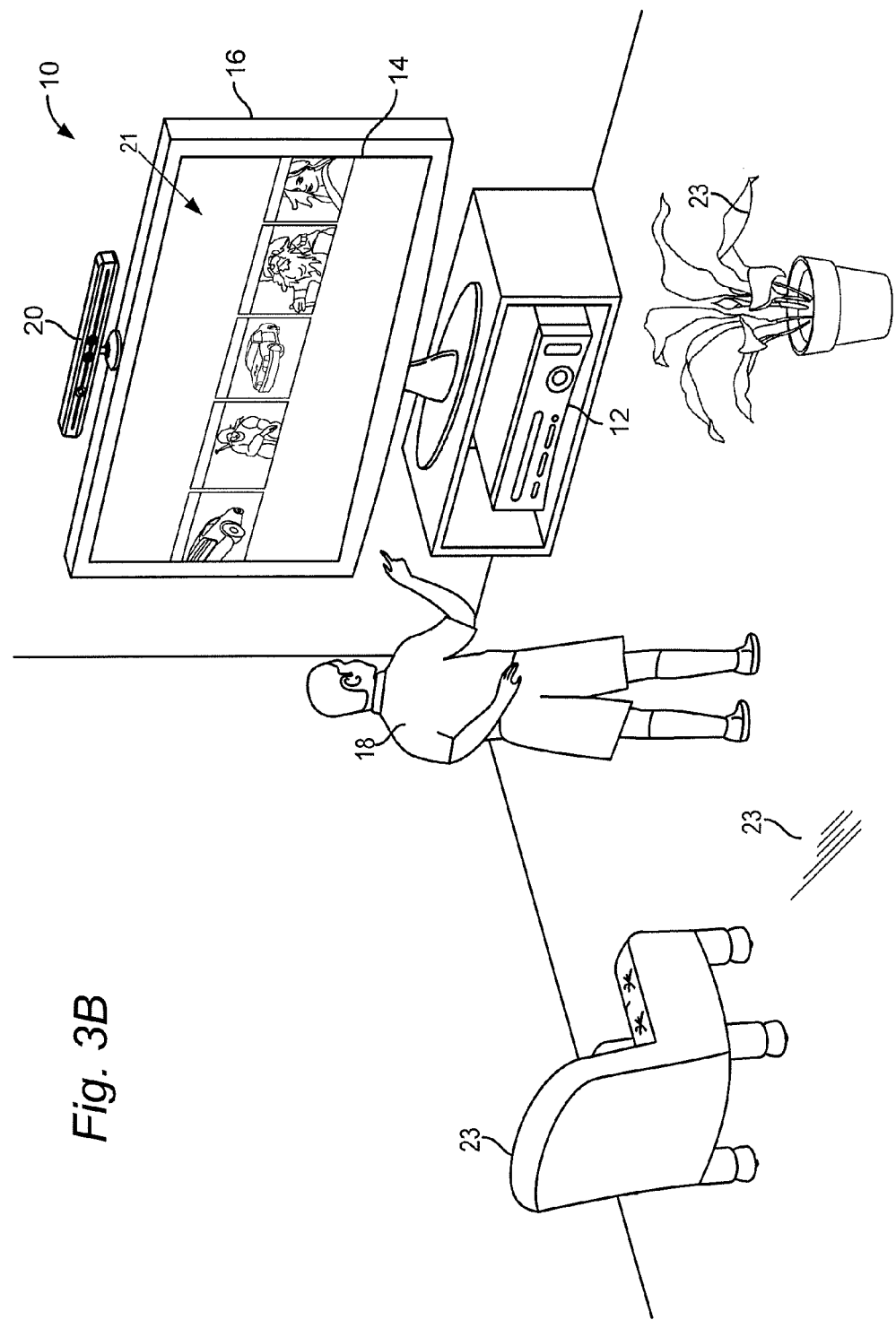

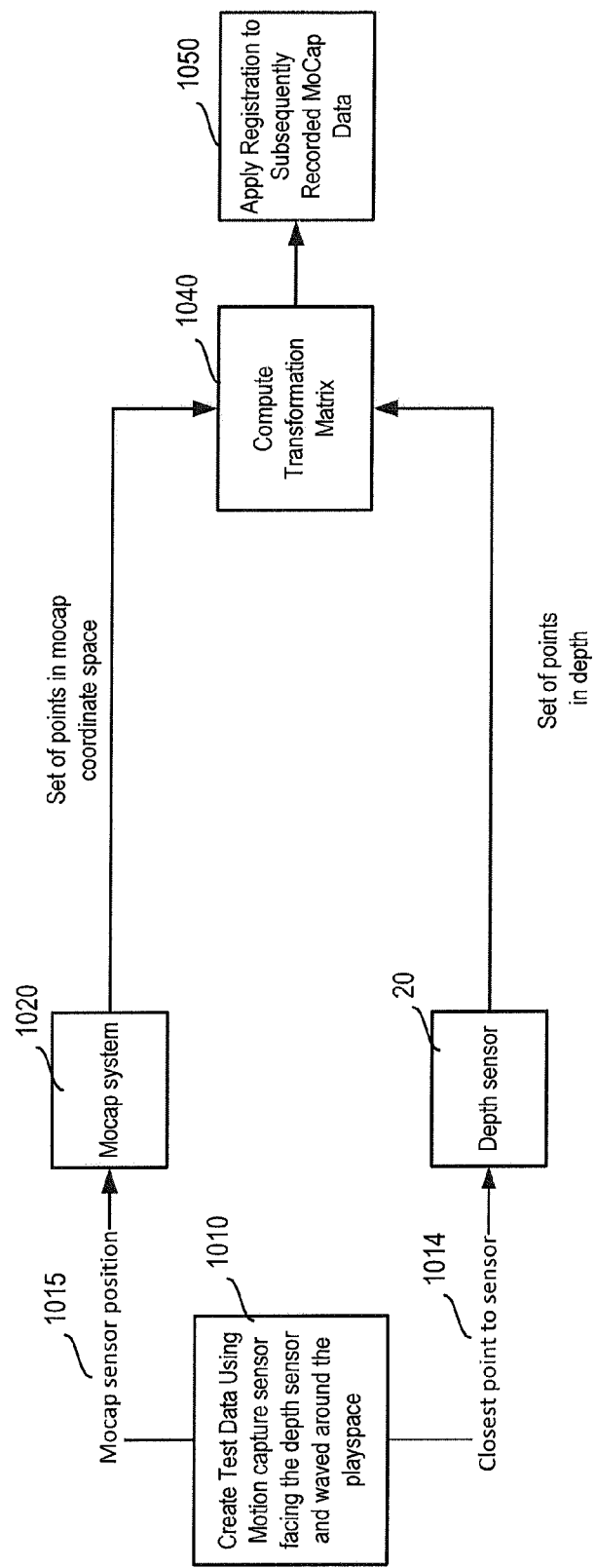

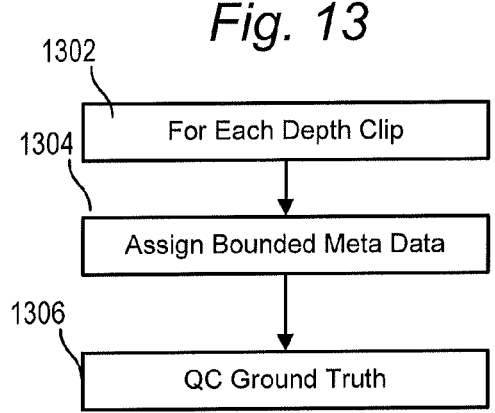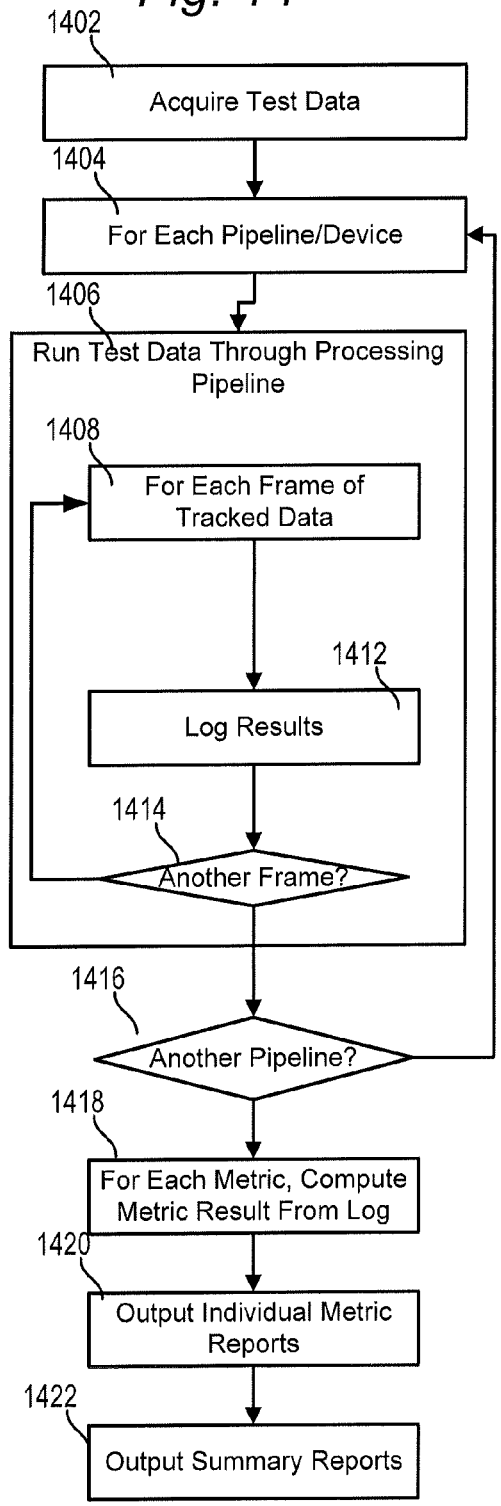

VALIDATION ANALYSIS OF HUMAN TARGET

BACKGROUND

Target recognition, analysis, and tracking systems have been created which use capture devices to determine the position and movement of objects and humans in a scene. The capture device may include a depth camera, RGB camera and audio detector which provide information to a capture processing pipeline comprising hardware and software elements. The processing pipeline provides motion recognition, analysis and motion tracking data to applications able to use the data. Exemplary applications include games and computer interfaces.

Accuracy in the tracking pipeline is desirable. Accuracy depends on a capability to determine movement of various types of user motion within a field of view for various types of users (male, female, tall, short, etc.) Enabling accuracy in the tracking pipeline is particularly difficult in providing a commercially viable device where the potential variations of the motions and types of users to be tracked is significantly greater than in a test or academic environment.

SUMMARY

In one embodiment, technology for testing a target recognition, analysis, and tracking system is provided. A method for verifying the accuracy of a target recognition, analysis, and tracking system includes creating test data and providing a searchable set of the test data. The test data may be recorded and/or synthesized depth clips having associated ground truth. The ground truth comprises an association of joint positions of a human with skeletal tracking information which has been verified to be accurate. Responsive to a request to test the pipeline, at least a subset of the searchable set of test data is provided to the pipeline. Tracking data is output from the pipeline and an analysis of the tracking data relative to the ground truth provides an indication of the accuracy of the pipeline code.

A system for verifying the accuracy of a target recognition, analysis, and tracking system, includes a searchable repository of recorded and synthesized depth clips and associated ground truth which is available to a number of processing pipelines under test. One or more processing devices each including at least one instance of a target recognition, analysis, and tracking pipeline analyze selected components of the test data. A job controller provides at least a subset of the searchable set of test data to test the pipeline and an analysis engine receives tracking data output from the pipeline on the at least subset of the searchable set. A report generator outputs an analysis of the tracking data relative to the ground truth in the at least subset to provide an output of the error relative to the ground truth.

Numerous features of the system and method which render the technology flexible, scalable and unique are described herein.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1B is a flowchart of the overall process validation analysis of depth and motion tracking for a target recognition, analysis, and tracking system.

FIG. 3B illustrates a further example embodiment of a target recognition, analysis, and tracking system.

FIG. 10 is a flowchart illustrating registration of the motion capture coordinates to the skeletal tracking coordinate space.

FIG. 13 is a flowchart illustrating manual annotation of test data.

FIG. 14 is a flowchart illustrating analyzing the output of a test pipeline against ground truth data.

DETAILED DESCRIPTION

Figure 1A:
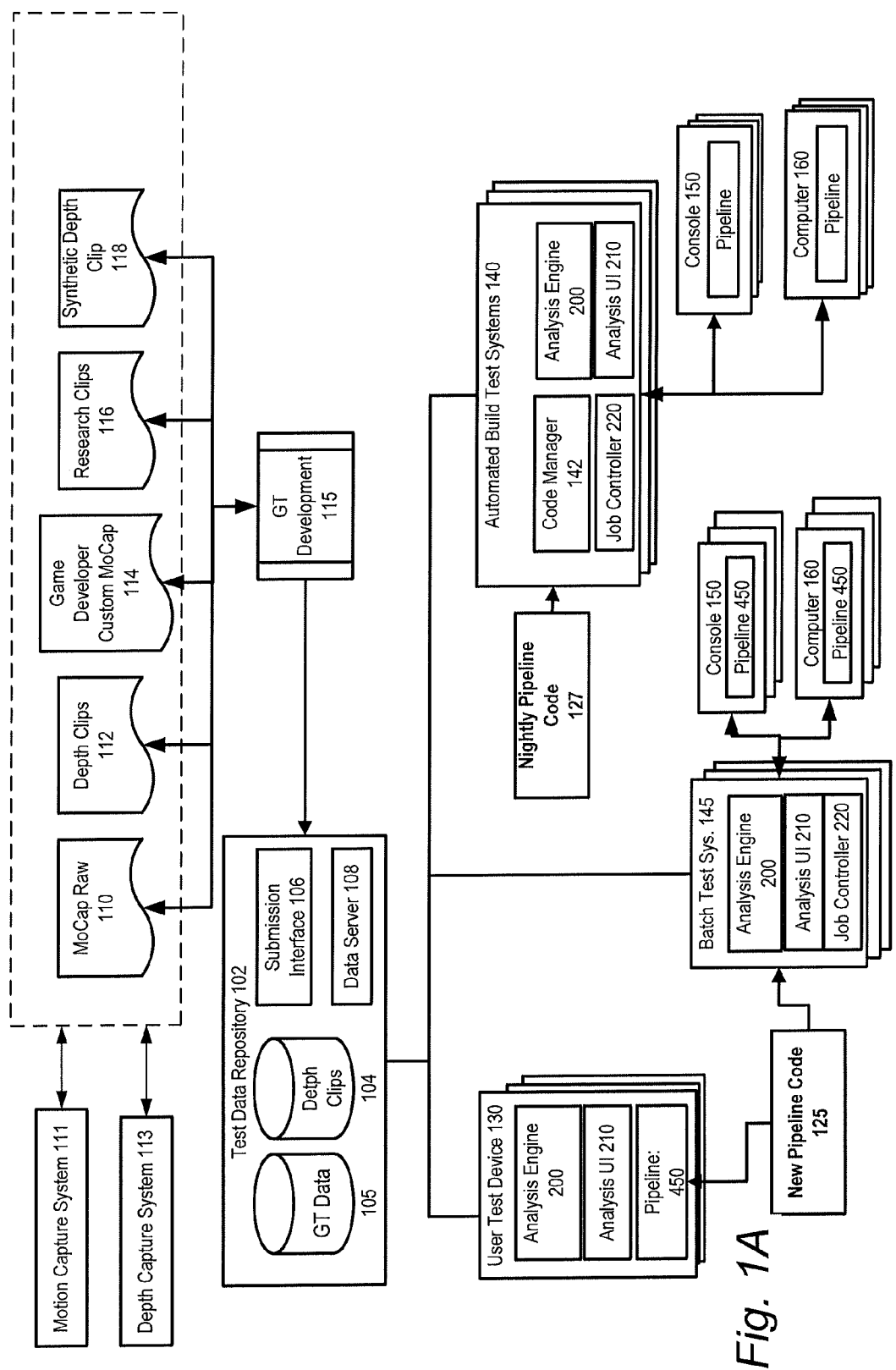
FIG. 1A is a block diagram depicting an environment for practicing the technology described herein.

Technology is provided which allows testing of target recognition, analysis, and tracking system. The target recognition, analysis, and tracking system may be used to recognize, analyze, and/or track a human target such as a user. The target recognition, analysis and tracking system includes a processing pipeline implemented in hardware and software to perform the recognition, analysis and tracking functions. Designers of such systems need to optimize such systems relative to known good data sets, and constantly strive to improve the accuracy of such systems.

The testing system includes a voluminous set of recorded and synthesized test data. The test data includes a plurality of depth clips comprising a sequence of depth frames recorded during a test data capture session. The test data is correlated with motion data to ascertain ground truth for the depth clip. The test data contains the motions and gestures of humans that developers of the pipeline or specific applications designed to use the pipeline are interested in recognizing. The ground truth reflects known accurate data in the depth clip. The ground truth may be of different types, including skeletal data, background removal data and floor data. The test data is annotated to allow developers to easily determine needed depth clips and build sets of depth clips into test suites. Synthesized depth clips can be created from existing clips and other three-dimensional object data, such as static objects within a scene. An analysis controller directs processing of test data into new pipelines, receives tracked results from the pipelines, and manages an analysis of the accuracy of the pipeline processing relative to the ground truth. An analysis of the individual errors, as well as a summary of the pipeline performance relative to previous pipelines, is provided. In this manner, the technology runs evaluations of new versions of the pipeline against either a local processing device, such as an Xbox 360® console or divides the work among many test consoles. It gathers the results and provides various statistical analysis on the data to help identify problems in tracking in certain scenarios. Scalable methods for generating, compositing, and synthesizing test data into new combinations of variables are also present.

Motion capture, motion tracking, or "mocap" are used interchangeably herein to describe recording movement and translating that movement to a digital model. In motion capture sessions, movements of one or more actors are sampled many times per second to record the movements of the actor.

Motion capture data may be the recorded or combined output of a motion capture device translated to a three dimensional model. A motion capture system tracks one or more feature points of a subject in space relative to its own coordinate system. The capture information may take any number of known formats. Motion capture data is created using any of a number of optical systems, or non-optical system, with active, passive or marker less systems, or inertial, magnetic or mechanical systems. In one embodiment, the model is developed by a processing pipeline in a target recognition, analysis, and tracking system. To verify the accuracy of the pipeline, the performance of the pipeline in both building the model and tracking movements of the model is compared against known-good skeletal tracking information.

Such known good skeletal tracking information is referred to herein as ground truth data. One type of ground truth data can be developed by manually or automatically tracking movement of a subject and verifying the points used in the skeletal model using a variety of techniques. Other types of ground truth include background data and floor position data. Depth clips with ground truth can then be used to test further implementations of the pipeline. Analysis metrics are provided in order to allow developers to evaluate the effectiveness of various interactions and changes to the pipeline.

In general, as described below, the target recognition, analysis, and tracking system of the present technology utilizes depth information to define and track the motions of a user within a field of view of a tracking device. A skeletal model of the user is generated, and points on the model are utilized to track the user's movements which are provided to corresponding applications which use the data for a variety of purposes. Accuracy of the skeleton model and the motions tracked by the skeleton model is generally desirable.

FIG. 1A illustrates an environment in which the present technology may be utilized. FIG. 1A is a block diagram illustrating various test data sources, a test data store, and a plurality of different types of testing systems in which the present technology may be utilized. To create test data for the test data store, in one embodiment, a motion capture clip of a test subject is created while simultaneously creating a depth clip of the subject using a depth sensor. The depth clip is a sequence of depth frames, each depth frame comprising an array of height values representing the depth sensor output of a single frame. Other methods of creating test data are also discussed herein.

In one embodiment, motion capture data is acquired using a motion capture system. Motion capture system 111 may comprise any of a number of known types of motion capture systems. In one embodiment, the motion capture system 111 is a magnetic motion capture system in which a number of sensors are placed on the body of a subject to measure the magnetic field generated by one or more transmitters. Motion capture data is distinguished from ground truth in that the motion capture data is the position (and in some cases orientation) of the sensors in relation to the motion capture system, which the ground truth is the position and in some cases orientation of the subject's joints in relation to the depth sensor. When using such system, a correlation between the positions detected by the motion capture system with sensors must be made to the simultaneously recorded depth clip to generate ground truth. This correlation is performed by registration and calibration between the motion capture system and the depth sensor data.

Also shown in FIG. 1A is a depth capture system which may include a depth sensor, such as depth camera 426 discussed below, to record depth clips.

Various sources of test data 110 through 118 can provide test data and ground truth for a test data repository 102. Raw motion capture data 110 is the output provided by an active or passive motion capture device, such as capture system 111. Raw motion capture data may not have been analyzed to provide associated ground truth information. Depth clip 112 may be data simultaneously recorded with motion capture data, or a depth clip may be created without an association to accompanying motion capture data. Such raw depth data can be manually reviewed by an annotator who reviews each or a portion of the frames in the depth clip and models the joints of the subject in the depth space. Specific sources of motion capture and depth data include game developer motion and depth clips 114, or researcher provided motion and depth clips 116 Game developer clips include clips which are specifically defined by application developers with motions necessary for the developer's game. For example, a tennis game might require motions which are very specific to playing tennis and great accuracy in distinguishing a forehand stroke from a ground stroke. Research clips 116 are provided by researchers seeking to push the development of the pipeline in a specific direction. Synthetic depth clips 118 are combinations of existing clips to define movement scenarios and scenes which might not otherwise be available.

Ground truth development 115 represents that correlation of the motion capture data to the depth data to create ground truth, or the manual annotation of depth data by a person to match the joint to the depth frames.

The environment of FIG. 1A include various types of testing systems including a user test device 130, a batch test system 145 and an automated build test system 140. Each of the test system 130, 145, 140 accesses the data repository 102 to test a target recognition, analysis, and tracking pipeline 450 used by the target recognition, analysis, and tracking system. The pipeline is discussed with respect to FIGS. 7 and 8.

Test data repository 102 includes a test data store 104 containing depth clips and ground truth data store 105 containing ground truth associated with the depth clips. It should be understood that data stores 104 and 105 may be combined into a single data store.

The test data repository 102 can include clip and ground truth data as well as a clip submission interface 106 and a data server 108. The submission interface 106 can be one of a batch process or web server which allows data creators to provide any of test data 110 through 118. Data repository 102 can include one or more standard databases housing the clip data and allowing metadata, described below to be associated with the clip data thereby allowing users to quickly and easily identify the information available in the various clips, selected clips, and/or all the clips, and retrieve them from the data store 108 for use in test devices 130, 145 and 140.

As discussed below with respect to FIG. 4, each target recognition, analysis, and tracking system may include, for example, depth imaging processing and skeletal tracking pipeline 450. This pipeline acquires motion data in the form of depth images, and processes the images to calculate the position, motion, identity, and other aspects of a user in a field of view of a capture device, such as capture device 20 in FIG. 4.

In one embodiment, a depth image processing and skeletal tracking pipeline 450 may comprise any combination of hardware and code to perform the various functions described with respect to FIGS. 4-8 and the associated applications referenced herein and incorporated by reference herein. In one embodiment, the hardware and code is modifiable by uploading updated code 125 into the processing systems.

Each of the test systems 130, 145, 140 has access to one or more versions of a motion tracking pipeline. As new versions of the pipeline are created (code 125, 127 in FIG. 1A), the test systems 130, 140 and 145 utilize depth clip and ground truth data to evaluate the performance of the new versions by comparing the performance of pipeline functions in tracking the motion in the test data against the known ground truth data.

For example, a user test device 130 which comprise of the processing device illustrated below with respect to FIGS. 17 and 18, may include pipeline code 450 which is updated by new code 125. The pipeline code may be executed within the processing device 130 of the user when performing a test on selected data from the data repository 102. When testing new code 125, the user test device 130 is configured by a developer to access clip data from the data repository 102 through the data server on which the pipeline is tested.

An analysis engine 200 described below with respect to FIG. 2, outputs an analysis of the depth image processing and skeletal tracking pipeline versus the ground truth associated with the test data input into the pipeline. The analysis engine 200 provides a number of reporting metrics to an analysis user interface 210.

Batch test systems 145 may comprise a set of one or more processing devices which include an analysis engine 200 and analysis user interface 210. The batch test system includes a connection to one or more consoles 150, such as processing devices 150 and 160. Each of the consoles 150 and computers 160 may execute a pipeline 450 and be updated with new pipeline code 125. New pipeline code may be submitted to the batch test system and, under the control of the batch test system, loaded into respective consoles 150 and computers 170.

The analysis engine 200 and a job controller 220 in the batch test systems 145 controls the provision of test data to each of the associated pipelines in the consoles and computers and gathers an analysis of the output of each of the consoles and computers on the new pipeline code 125 which is submitted and on which the batch test is performed.

The automated build test system 140 is similar to the batch system in that it provides access to a plurality of consoles and computers each of which having an associated processing pipeline. The processing pipeline is defined by new pipeline code comprising, for example, nightly code 127 which is submitted to the automated build test systems 140. The automated build test system is designed to perform a regular, periodic test on newly submitted code 127. As such, a code manager 142 manages when new code 127 is allowed into the system, which code is verified to be testable, and which code, under control of the analysis engine 200 is provided to consoles 150 and 170 for periodic processing. It will be understood that periodic processing may occur, for example, on some other periodic bases. Automated test build systems 140 are useful when a number of different developers are providing new pipeline code, the management of which is defined by the code manager 142. The code could be checked either on a nightly basis, after each check in of developer code, or on some other schedule as defined by the automated build test system.

FIG. 1B is a flow chart illustrating a method for implementing the present technology. At 164, a depth clip of the movements of interest of a subject is created. Various embodiments for creating the depth clip and resulting test data (including the depth clip and associated ground truth for the depth clip) is discussed in FIG. 7A. In one embodiment test data is created without motion capture data. In another embodiment, test data can be created by utilizing a motion capture system to create a motion clip simultaneously with a depth clip at 164, which are then used to create ground truth for the depth clip. Alternatively, at 164, a depth clip may be synthesized from other depth clips and three dimensional data.

At 166, ground truth is created and associated with test data. The ground truth data is created and/or validated by either a machine process or a manual marking process. As explained below, target recognition, analysis, and tracking system utilizes a skeletal model such as that illustrated in FIGS. 6A and 6B, to identify test subjects within the field of view of capture device. In one context, the ground truth data is a verification that a skeletal model used to track a subject within or outside of the field of view and the actual motions of the subject are accurately recognized in space by the model. As noted above, ground truth such as background information and floor position may be used for other purposes, described herein. Annotated ground truth and depth data is stored at 168. At 168 the test data is annotated with metadata to allow for advanced searching of data types. Annotating metadata is discussed below with respect to FIG. 13. Annotation of test data comprises attaching an associated set of metadata to the test data. It will be understood that the number and type of data tags attached to the data and described below are exemplary. The data allows developers to quickly find specific types of data which can be used in performing specific tests on new pipeline code When a test on a particular pipeline is initiated at 170, generally, one of two test types will be provided; a custom or batch test or a nightly (periodic) test.

If an automated or periodic test such as that performed by the automated build test system 140 is to be used, then the test data will be run through the particular processing pipeline or pipelines of interest at 174, and the output analyzed against the ground truth at 176. A variety of reports and report summaries can be provided at 178. The process of analyzing the pipeline against the ground truth at 176 will be explained below and is performed in relation to the detection of differences between the ground truth and the output of the pipeline and is analyzed using a number of different metrics. Generally, the automated or periodic test will be run against the same set of data on a regular basis in order to track changes to the performance of the code over time.

If a custom or batch test is to be utilized at 172, the test may need to be optimized for selected features or test specific portions of the pipeline. At 182, optionally, a test suite is built at 182. A test suite can be a subset of test data and associated ground truth which is customized for a particular function. For example, if an application developer wishes to test a particular pipeline relative to the use in a tennis game, then accuracy in the pipeline detection of a user's arm motions differentiated between overhand strokes, servers, ground strokes, forehands and backhands would be optimal in the processing pipeline. If the test suite contains sufficient data to perform the custom analysis, then new additional data requirements are not required at 184 and the test suite of data can be run through the processing pipeline at 186. Again the output of the pipeline is analyzed against the existing ground truth in the test suite at 188 and the output reported at 190 in a manner similar to that described above with respect to step 178. If additional test data is are needed, then steps 172, 174, 176 and 178 can be repeated (at 192) to create custom data needed to be added to the test suite created at 182 for purpose of the particular application for which the test suite is being utilized. Custom data can be newly recorded data or synthesized composite data, as described below.

Figure 2:
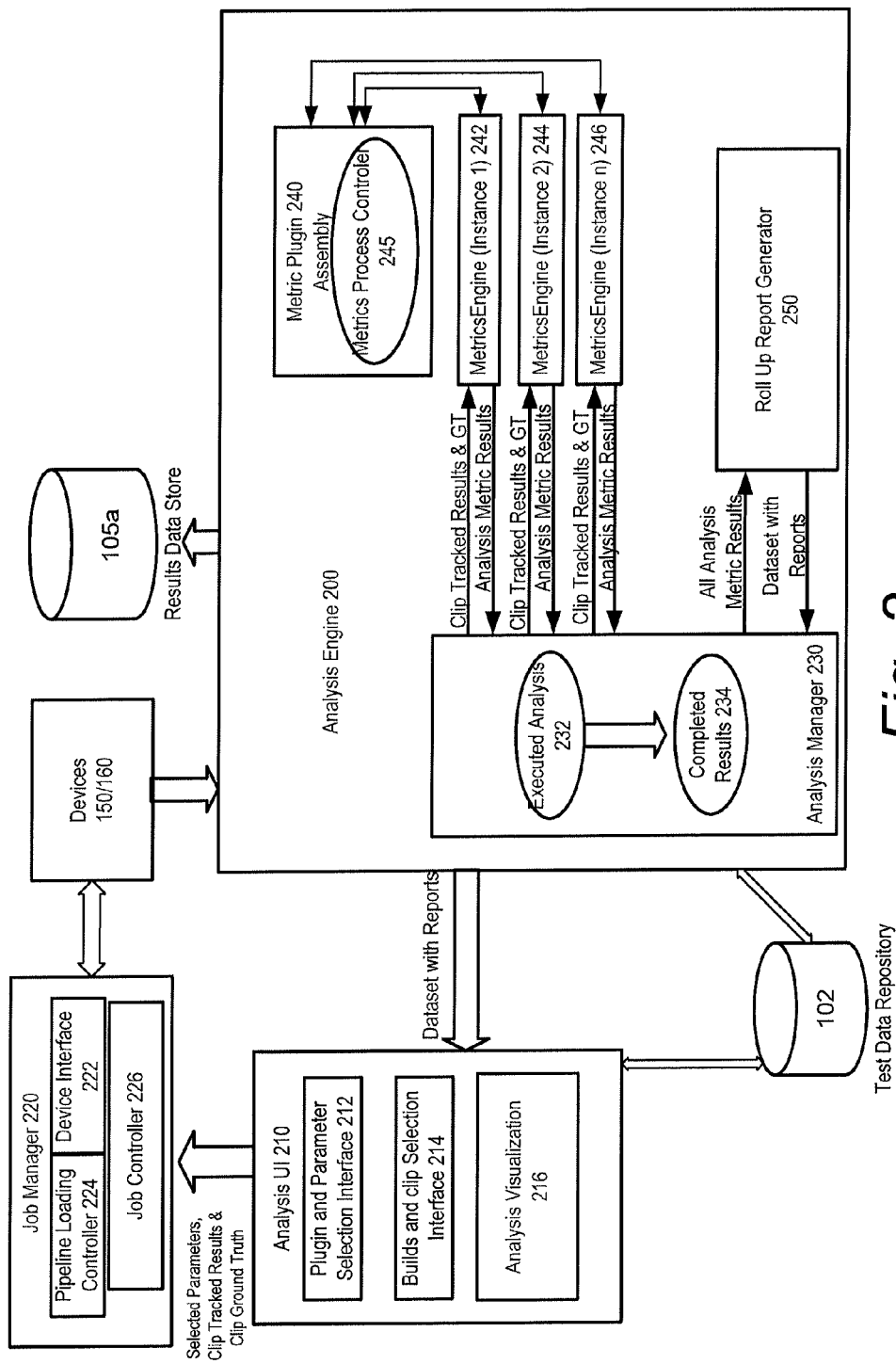
FIG. 2 is a block diagram of an analysis engine used in the environment of FIG. 1A.

FIG. 2 illustrates the analysis engine 200, analysis user interface 210 and job manager 220. As noted above, the analysis engine 200 can be provided in a user test system 140, a batch test system 145 or automated test build systems 140.

The analysis user interface 210 allows the developer or other user to define specific test data and metrics for use by the job controller and the analysis engine in one or more test sequences and reports. The analysis user interface 210 also allows a user to select various test data for use in a particular test run using a build and test clip selection interface 214. For any test, a specific selection of test code and metrics, or all the code and all metrics, may be used in the test. The analysis user interface provides the user with a visualization display 216 which outputs the result of the roll up report generator, and individual metrics reports, provided by the analysis engine. The job manager 220 is fed test data by the analysis UI 210 and result sets to be analyzed by the devices 150/160.

The job manager 220 includes a pipeline loading controller 224, and a job controller 226. The pipeline loading controller receives new pipeline code 125 from any number of sources and ensures that the pipeline code can be installed in each of the number of devices using the device interface 222. The job controller 226 receives input from the analysis user interface 210 and defines the information provided to the various pipelines in each of the different devices providing code to be analyzed and receiving the executed analysis. In other implementations, a set of batch test instructions may supplement or replace the analysis UI and job manager 220.

The analysis engine includes an analysis manager 230, report generator 250 and metric plugin assembly 240 with a metric process controller 245. An analysis manager 230 takes the executed analysis 232 and compiles the completed results 234. An executed analysis includes clip tracking results generated by a pipeline compared against ground truth for the clip. In one embodiment, individual data elements are compared between the clip and the ground truth, and the errors passed to a number of statistical metrics engines. Alternatively, the metric engines call a number of metric plugins which each do the comparison of the tracked results to the ground truth and further evaluate the error. A SkeletonMetricsPlugin for example produces the raw errors and any derived statistical evaluation for a clip against the ground truth. In another embodiment, there may be a metric engine for each physical CPU core available for use by the analysis engine, and each metric engine has a list of all metric plugins that have been requested.

A test run is defined by feeding at least a subset of the searchable set of test data to a given tracking pipeline and logging the results (i.e. where the skeleton joints were for each frame). That tracked result is then compared in the analysis engine to the ground truth for each test data using a variety of metrics. The output from that is processed by the report generator to create aggregated reports. In addition, useful information may be determined from the test run even without relation to the ground truth, including performance and general tracking information such as whether any skeletons tracked for a frame or not.

The clip track results and ground truth is provided to any of a number of different metric engines 242, 244, 246, which calculate various reporting metrics on the track results relative to the ground truth. Exemplary metrics are described below. The metrics engines are enabled via a plugin 240 which allows alteration and customization of available metrics which can be used for analysis. The example metrics described herein are exemplary only, and illustrative of one embodiment of the present technology. Any number of different types of metrics may be utilized in accordance with the present technology to analyze the ground truth data relative to the tracking data as described herein. The metrics engines return analysis metric results to the analysis manager which compiles the results and outputs them to a roll up report generator 250. The roll up report generator provides a set of data set with reports to the analysis manager for provision to the analysis user interface 210. Exemplary summary reports are described below.

Figure 3A:
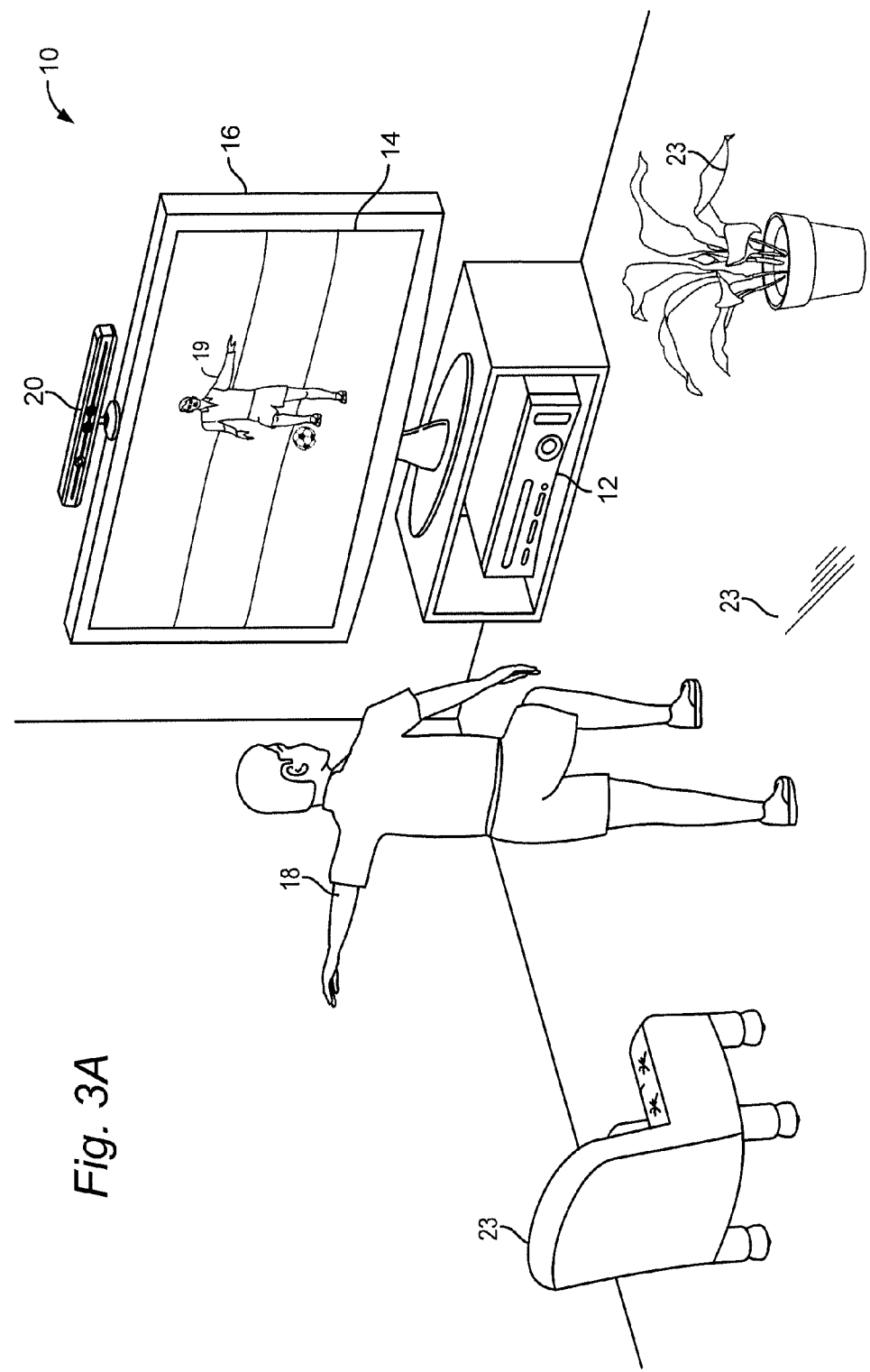
FIG. 3A illustrates an example embodiment of a target recognition, analysis, and tracking system.
Figure 4:
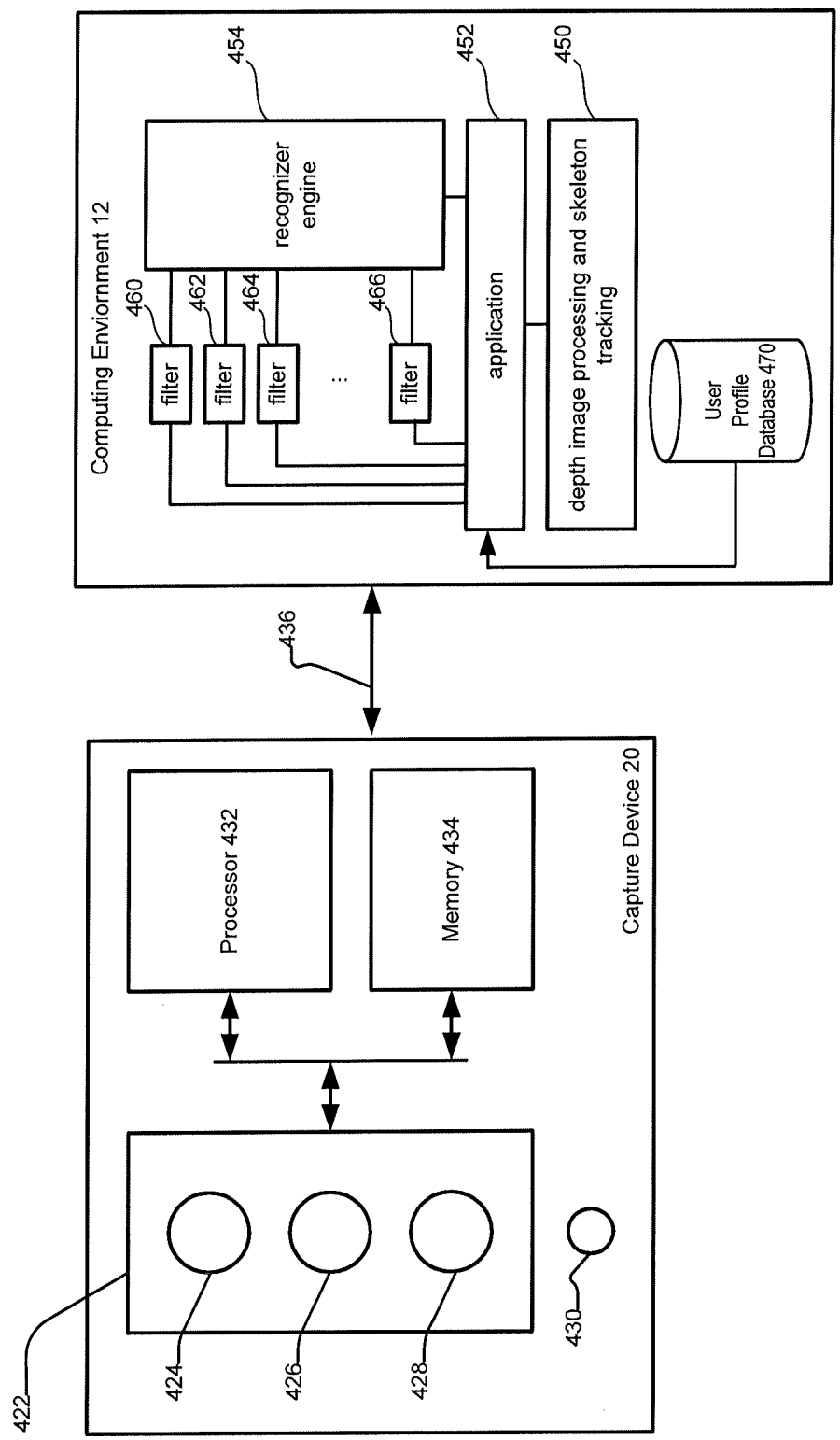
FIG. 4 illustrates an example embodiment of a capture device that may be used in a target recognition, analysis, and tracking system.

FIGS. 3A-4 illustrate a target recognition, analysis, and tracking system 10 which may be used to recognize, analyze, and/or track a human target such as the user 18. Embodiments of the target recognition, analysis, and tracking system 10 include a computing environment 12 for executing a gaming or other application. The computing environment 12 may include hardware components and/or software components such that computing environment 12 may be used to execute applications such as gaming and non-gaming applications. In one embodiment, computing environment 12 may include a processor such as a standardized processor, a specialized processor, a microprocessor, or the like that may execute instructions stored on a processor readable storage device for performing processes described herein.

The system 10 further includes a capture device 20 for capturing image and audio data relating to one or more users and/or objects sensed by the capture device. In embodiments, the capture device 20 may be used to capture information relating to partial or full body movements, gestures and speech of one or more users, which information is received by the computing environment and used to render, interact with and/or control aspects of a gaming or other application. Examples of the computing environment 12 and capture device 20 are explained in greater detail below.

Embodiments of the target recognition, analysis and tracking system 10 may be connected to an audio/visual (A/V) device 16 having a display 14. The device 16 may for example be a television, a monitor, a high-definition television (HDTV), or the like that may provide game or application visuals and/or audio to a user. For example, the computing environment 12 may include a video adapter such as a graphics card and/or an audio adapter such as a sound card that may provide audio/visual signals associated with the game or other application. The A/V device 16 may receive the audio/visual signals from the computing environment 12 and may then output the game or application visuals and/or audio associated with the audio/visual signals to the user 18. According to one embodiment, the audio/visual device 16 may be connected to the computing environment 12 via, for example, an S-Video cable, a coaxial cable, an HDMI cable, a DVI cable, a VGA cable, a component video cable, or the like.

In embodiments, the computing environment 12, the A/V device 16 and the capture device 20 may cooperate to render an avatar or on-screen character 19 on display 14. For example, FIG. 3A shows where a user 18 playing a soccer gaming application. The user's movements are tracked and used to animate the movements of the avatar 19. In embodiments, the avatar 19 mimics the movements of the user 18 in real world space so that the user 18 may perform movements and gestures which control the movements and actions of the avatar 19 on the display 14. In FIG. 3B, the capture device 20 is used in a NUI system where, for example, a user 18 is scrolling through and controlling a user interface 21 with a variety of menu options presented on the display 14. In FIG. 1A, the computing environment 12 and the capture device 20 may be used to recognize and analyze movements and gestures of a user's body, and such movements and gestures may be interpreted as controls for the user interface.

The embodiments of FIGS. 3A-3B are two of many different applications which may be run on computing environment 12, and the application running on computing environment 12 may be a variety of other gaming and non-gaming applications.

FIGS. 3A-3B shown an environment containing static, background objects 23, such as a floor, chair and plant. These are objects within the FOV captured by capture device 20, but do not change from frame to frame. In addition to the floor, chair and plant shown, static objects may be any objects viewed by the image cameras in capture device 20. The additional static objects within the scene may include any walls, ceiling, windows, doors, wall decorations, etc.

Suitable examples of a system 10 and components thereof are found in the following co-pending patent applications, all of which are hereby specifically incorporated by reference: U.S. patent application Ser. No. 12/475,094, entitled "Environment and/or Target Segmentation," filed May 29, 2009; U.S. patent application Ser. No. 12/511,850, entitled "Auto Generating a Visual Representation," filed Jul. 29, 2009; U.S. patent application Ser. No. 12/474,655, entitled "Gesture Tool," filed May 29, 2009; U.S. patent application Ser. No. 12/603,437, entitled "Pose Tracking Pipeline," filed Oct. 21, 2009; U.S. patent application Ser. No. 12/475,308, entitled "Device for Identifying and Tracking Multiple Humans Over Time," filed May 29, 2009, U.S. patent application Ser. No. 12/575,388, entitled "Human Tracking System," filed Oct. 7, 2009; U.S. patent application Ser. No. 12/422,661, entitled "Gesture Recognizer System Architecture," filed Apr. 13, 2009; U.S. patent application Ser. No. 12/391,150, entitled "Standard Gestures," filed Feb. 23, 2009; and U.S. patent application Ser. No. 12/474,655, entitled "Gesture Tool," filed May 29, 2009.

FIG. 4 illustrates an example embodiment of the capture device 20 that may be used in the target recognition, analysis, and tracking system 10. In an example embodiment, the capture device 20 may be configured to capture video having a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight. X and Y axes may be defined as being perpendicular to the Z axis. The Y axis may be vertical and the X axis may be horizontal. Together, the X, Y and Z axes define the 3-D real world space captured by capture device 20.

As shown in FIG. 4, the capture device 20 may include an image camera component 422. According to an example embodiment, the image camera component 422 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 4, according to an example embodiment, the image camera component 422 may include an IR light component 424, a three-dimensional (3-D) camera 426, and an RGB camera 428 that may be used to capture the depth image of a scene. For example, in time-of-flight analysis, the IR light component 424 of the capture device 20 may emit an infrared light onto the scene and may then use sensors (not shown) to detect the backscattered light from the surface of one or more targets and objects in the scene using, for example, the 3-D camera 426 and/or the RGB camera 428.

In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device 20 to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as a grid pattern or a stripe pattern) may be projected onto the scene via, for example, the IR light component 424. Upon striking the surface of one or more targets or objects in the scene, the pattern may become deformed in response. Such a deformation of the pattern may be captured by, for example, the 3-D camera 426 and/or the RGB camera 428 and may then be analyzed to determine a physical distance from the capture device 20 to a particular location on the targets or objects.

The capture device 20 may further include a microphone 430. The microphone 430 may include a transducer or sensor that may receive and convert sound into an electrical signal. According to one embodiment, the microphone 430 may be used to reduce feedback between the capture device 20 and the computing environment 12 in the target recognition, analysis, and tracking system 10. Additionally, the microphone 430 may be used to receive audio signals that may also be provided by the user to control applications such as game applications, non-game applications, or the like that may be executed by the computing environment 12.

In an example embodiment, the capture device 20 may further include a processor 432 that may be in operative communication with the image camera component 422. The processor 432 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The capture device 20 may further include a memory component 434 that may store the instructions that may be executed by the processor 432, images or frames of images captured by the 3-D camera or RGB camera, or any other suitable information, images, or the like. According to an example embodiment, the memory component 434 may include random access memory (RAM), read only memory (ROM), cache, Flash memory, a hard disk, or any other suitable storage component. As shown in FIG. 4, in one embodiment, the memory component 434 may be a separate component in communication with the image camera component 22 and the processor 432. According to another embodiment, the memory component 34 may be integrated into the processor 32 and/or the image camera component 22.

As shown in FIG. 4, the capture device 20 may be in communication with the computing environment 12 via a communication link 436.

Computing environment 12 includes depth image processing and skeletal tracking pipeline 450, which uses the depth images to track one or more persons detectable by the depth camera function of capture device 20. Depth image processing and skeletal tracking pipeline 450 provides the tracking information to application 452, which can be a video game, productivity application, communications application or other software application etc. The audio data and visual image data is also provided to application 452 and depth image processing and skeletal tracking module 450. Application 452 provides the tracking information, audio data and visual image data to recognizer engine 454.

Recognizer engine 454 is associated with a collection of filters 460, 462, 464, . . . , 466 each comprising information concerning a gesture, action or condition that may be performed by any person or object detectable by capture device 20. For example, the data from capture device 20 may be processed by filters 460, 462, 464, . . . , 466 to identify when a user or group of users has performed one or more gestures or other actions. Those gestures may be associated with various controls, objects or conditions of application 452. Thus, computing environment 12 may use the recognizer engine 454, with the filters, to interpret and track movement of objects (including people).

Recognizer engine 454 includes multiple filters 460, 462, 464, . . . , 466 to determine a gesture or action. A filter comprises information defining a gesture, action or condition along with parameters, or metadata, for that gesture, action or condition. For instance, a throw, which comprises motion of one of the hands from behind the rear of the body to past the front of the body, may be implemented as a gesture comprising information representing the movement of one of the hands of the user from behind the rear of the body to past the front of the body, as that movement would be captured by the depth camera. Parameters may then be set for that gesture. Where the gesture is a throw, a parameter may be a threshold velocity that the hand has to reach, a distance the hand travels (either absolute, or relative to the size of the user as a whole), and a confidence rating by the recognizer engine that the gesture occurred. These parameters for the gesture may vary between applications, between contexts of a single application, or within one context of one application over time.

Inputs to a filter may comprise things such as joint data about a user's joint position, angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made.

More information about recognizer engine 454 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool" filed on May 29, 2009. both of which are incorporated herein by reference in their entirety.

Figure 5:
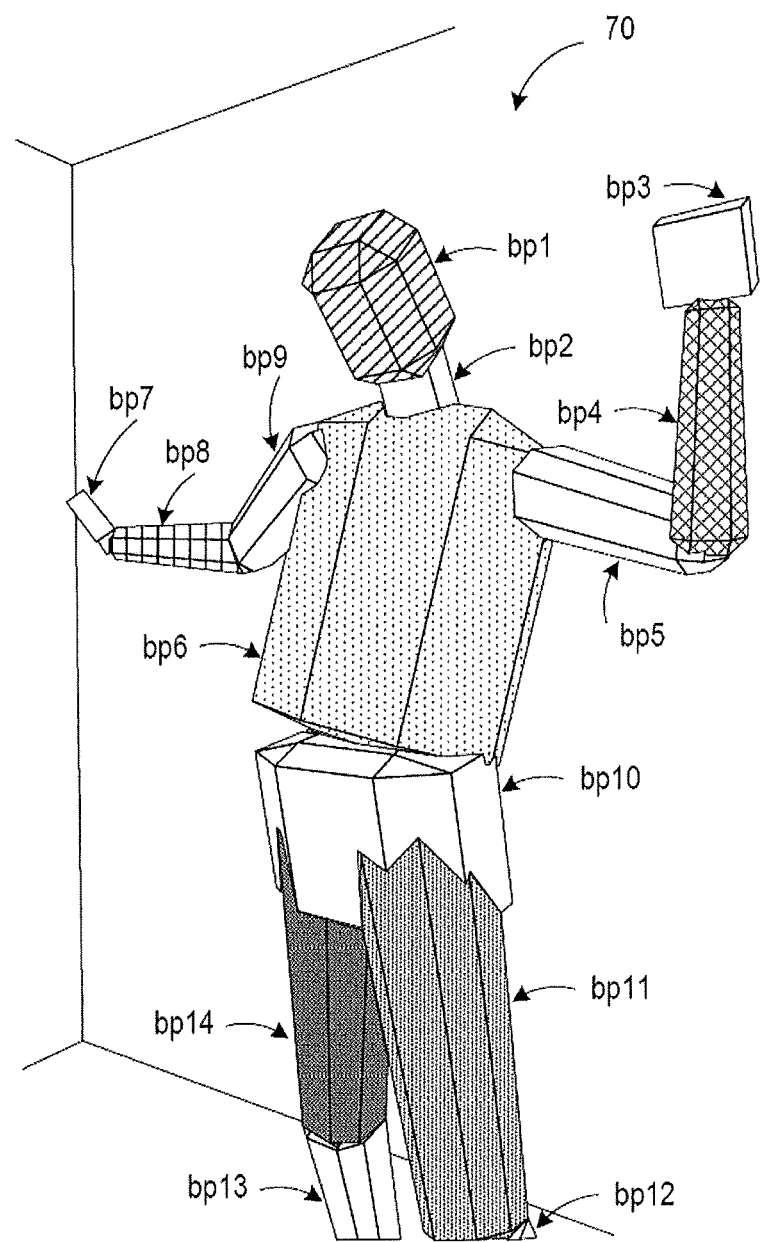
FIG. 5 shows an exemplary body model used to represent a human target.

FIG. 5 shows a non-limiting visual representation of an example body model 70. Body model 70 is a machine representation of a modeled target (e.g., game player 18 from FIGS. 3A and 3B). The body model may include one or more data structures that include a set of variables that collectively define the modeled target in the language of a game or other application/operating system.

A model of a target can be variously configured without departing from the scope of this disclosure. In some examples, a model may include one or more data structures that represent a target as a three-dimensional model including rigid and/or deformable shapes, or body parts. Each body part may be characterized as a mathematical primitive, examples of which include, but are not limited to, spheres, anisotropically-scaled spheres, cylinders, anisotropic cylinders, smooth cylinders, boxes, beveled boxes, prisms, and the like.

For example, body model 70 of FIG. 5 includes body parts bp1 through bp14, each of which represents a different portion of the modeled target. Each body part is a three-dimensional shape. For example, bp3 is a rectangular prism that represents the left hand of a modeled target, and bp5 is an octagonal prism that represents the left upper-arm of the modeled target. Body model 70 is exemplary in that a body model may contain any number of body parts, each of which may be any machine-understandable representation of the corresponding part of the modeled target.

A model including two or more body parts may also include one or more joints. Each joint may allow one or more body parts to move relative to one or more other body parts. For example, a model representing a human target may include a plurality of rigid and/or deformable body parts, wherein some body parts may represent a corresponding anatomical body part of the human target. Further, each body part of the model may include one or more structural members (i.e., "bones" or skeletal parts), with joints located at the intersection of adjacent bones. It is to be understood that some bones may correspond to anatomical bones in a human target and/or some bones may not have corresponding anatomical bones in the human target.

Figure 6A:
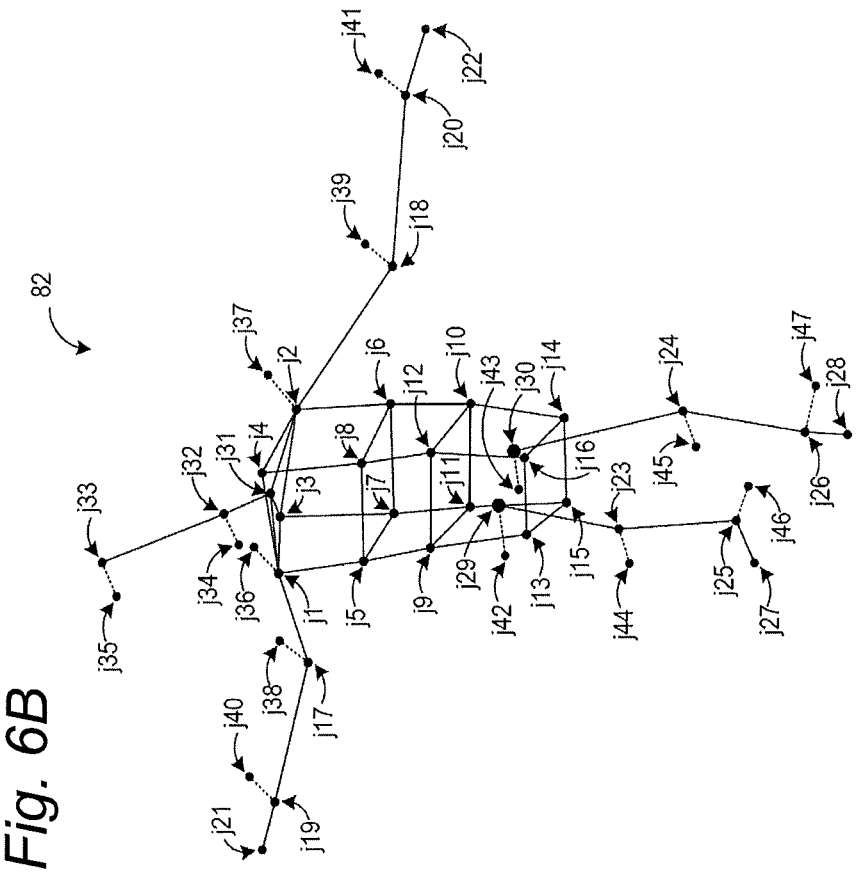
FIG. 6A shows a substantially frontal view of an exemplary skeletal model used to represent a human target.
Figure 6B:
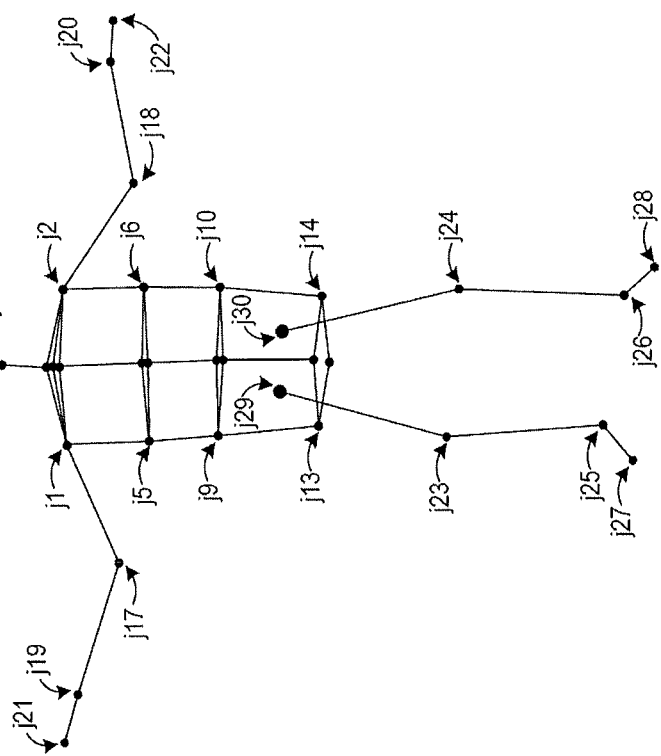
FIG. 6B shows a skewed view of an exemplary skeletal model used to represent a human target.

The bones and joints may collectively make up a skeletal model, which may be a constituent element of the body model. In some embodiments, a skeletal model may be used instead of another type of model, such as model 70 of FIG. 5. The skeletal model may include one or more skeletal members for each body part and a joint between adjacent skeletal members. Exemplary skeletal model 80 and exemplary skeletal model 82 are shown in FIGS. 6A and 6B, respectively. FIG. 6A shows a skeletal model 80 as viewed from the front, with joints j1 through j33. FIG. 5 shows a skeletal model 82 as viewed from a skewed view, also with joints j1 through j33.

Skeletal model 82 further includes roll joints j34 through j47, where each roll joint may be utilized to track axial roll angles. For example, an axial roll angle may be used to define a rotational orientation of a limb relative to its parent limb and/or the torso. For example, if a skeletal model is illustrating an axial rotation of an arm, roll joint j40 may be used to indicate the direction the associated wrist is pointing (e.g., palm facing up). By examining an orientation of a limb relative to its parent limb and/or the torso, an axial roll angle may be determined. For example, if examining a lower leg, the orientation of the lower leg relative to the associated upper leg and hips may be examined in order to determine an axial roll angle.

A skeletal model may include more or fewer joints without departing from the spirit of this disclosure. Further embodiments of the present system explained hereinafter operate using a skeletal model having 31 joints.

As described above, some models may include a skeleton and/or other body parts that serve as a machine representation of a modeled target. In some embodiments, a model may alternatively or additionally include a wireframe mesh, which may include hierarchies of rigid polygonal meshes, one or more deformable meshes, or any combination of the two.

The above described body part models and skeletal models are non-limiting examples of types of models that may be used as machine representations of a modeled target. Other models are also within the scope of this disclosure. For example, some models may include polygonal meshes, patches, non-uniform rational B-splines, subdivision surfaces, or other high-order surfaces. A model may also include surface textures and/or other information to more accurately represent clothing, hair, and/or other aspects of a modeled target. A model may optionally include information pertaining to a current pose, one or more past poses, and/or model physics. It is to be understood that a variety of different models that can be posed are compatible with the herein described target recognition, analysis, and tracking.

As mentioned above, a model serves as a representation of a target, such as game player 18 in FIGS. 3A and 3B. As the target moves in physical space, information from a capture device, such as depth camera 20 in FIG. 4, can be used to adjust a pose and/or the fundamental size/shape of the model in each frame so that it accurately represents the target.

Figure 7A:
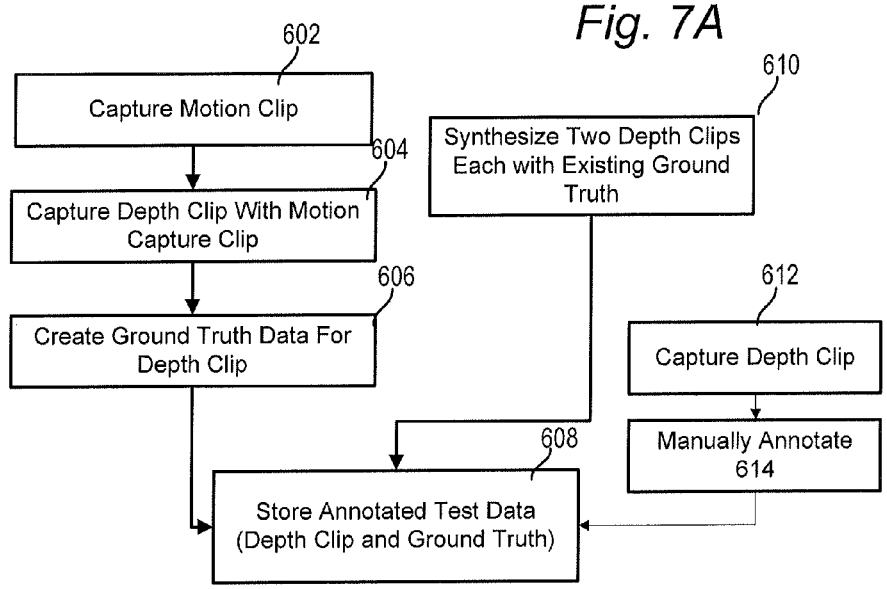
FIG. 7A is a flowchart illustrating a process for creating test data.

FIG. 7A depicts a flow diagram of an example of the various methods for creating test data. Test data may be created by simultaneously capturing a motion clip at 602 along with a depth clip at 604, both of the same movements of a subject at the same time, which are then used to create ground truth for the depth clip at 606. As discussed below at FIGS. 9B and 10, this simultaneous recording is preceded by a registration between the motion capture system and the depth capture system. Alternatively, two test clips may be synthesized together with the ground truth included therewith being inherited by the synthesized clip. Alternatively, a depth clip of a subject may be captured at 612 and manually annotated by a developer with skeletal tracking coordinates at 614. At 608, test data comprising a depth clip and associated ground truth is stored as test data.

Figure 7B:
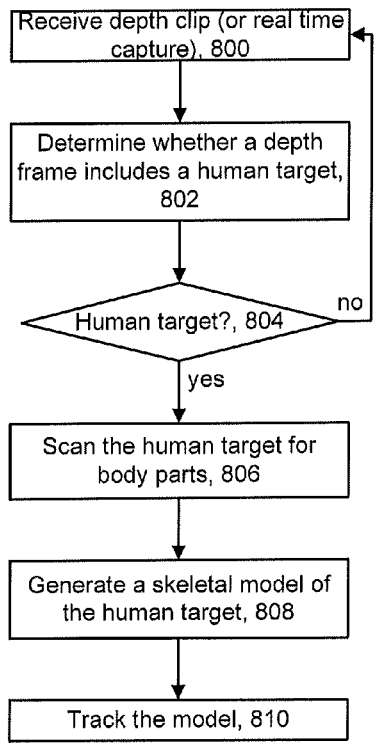
FIG. 7B is a flowchart of the high level operation of an embodiment of a target recognition, analysis, and tracking system motion tracking pipeline.

FIG. 7B is a flow chart representing the functions of the target recognition, analysis, and tracking pipeline illustrated at 450 above and implemented by new code 125 which is tested by the system. The example method may be implemented using, for example, the capture device 20 and/or the computing environment 12 of the target recognition, analysis and tracking system 50 described with respect to FIGS. 3A-4.

At step 800, depth information from the capture device, or in the case of a test, a depth clip, is received. At step 802, a determination is made as to whether the depth information or clip includes a human target. This determination is made based on the model fitting and model resolution processes described below. If the human target is determined to 804, then the human target is scanned for body parts at 808, a model of the human target generated at 808, and the model tracked at 810.

The depth information may comprise the depth clip created in the processes discussed above with respect to FIG. 7A. Upon receiving a clip including a number of depth images at 800, each image in the clip may be downsampled to a lower processing resolution such that the depth image may be more easily used and/or more quickly processed with less computing overhead. Additionally, one or more high-variance and/or noisy depth values may be removed and/or smoothed from the depth image; portions of missing and/or removed depth information may be filled in and/or reconstructed; and/or any other suitable processing may be performed on the received depth information may such that the depth information may used to generate a model such as a skeletal model, which will be described in more detail below.

At 802, the target recognition, analysis and tracking system may determine whether the depth image includes a human target. For example, at 802, each target or object in the depth image may be flood filled and compared to a pattern to determine whether the depth image includes a human target. An acquired image may include a two-dimensional (2-D) pixel area of the captured scene where each pixel in the 2-D pixel area may represent a depth value.

At 804, if the depth image does not include a human target, a new depth image of a capture area may be received at 800 such that the target recognition, analysis and tracking system may determine whether the new depth image may include a human target at 802.

At 804, if the depth image includes a human target, the human target may be scanned for one or more body parts at 808. According to one embodiment, the human target may be scanned to provide measurements such as length, width, or the like associated with one or more body parts of a user such as the user 18 described above with respect to FIGS. 3A and 3B such that an accurate model of the user may be generated based on such measurements.

If the depth image of a frame includes a human target, the frame may be scanned for one or more body parts at 806. The determined value of a body part for each frame may then be averaged such that the data structure may include average measurement values such as length, width, or the like of the body part associated with the scans of each frame. According another embodiment, the measurement values of the determined body parts may be adjusted such as scaled up, scaled down, or the like such that measurements values in the data structure more closely correspond to a typical model of a human body.

At 808, a model of the human target may then be generated based on the scan. For example, according to one embodiment, measurement values determined by the scanned bitmask may be used to define one or more joints in a skeletal model. The one or more joints may be used to define one or more bones that may correspond to a body part of a human.

At 810, the model may then be tracked. For example, according to an example embodiment, the skeletal model such as the skeletal model 82 described above with respect to FIG. 6B may be a representation of a user such as the user 18. As the user moves in physical space, information from a capture device such as the capture device 20 described above with respect to FIG. 4 may be used to adjust the skeletal model such that the skeletal model may accurately represent the user. In particular, one or more forces may be applied to one or more force-receiving aspects of the skeletal model to adjust the skeletal model into a pose that more closely corresponds to the pose of the human target in physical space.

Figure 7C:
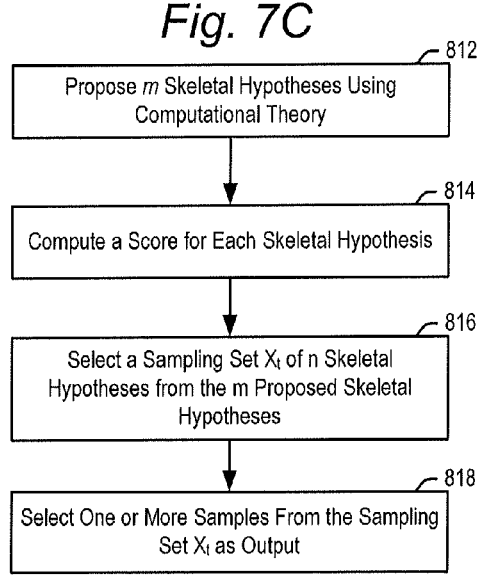
FIG. 7C is a flowchart of a model fitting process of FIG. 7A.

FIG. 7C is a flowchart of an embodiment of the present system for obtaining a model (e.g., skeletal model 82, generated in a step 808 of FIG. 7B) of a user 18 for a given frame or other time period. In addition to or instead of skeletal joints, the model may include one or more polygonal meshes, one or more mathematical primitives, one or more high-order surfaces, and/or other features used to provide a machine representation of the target. Furthermore, the model may exist as an instance of one or more data structures existing on a computing system.

The method of FIG. 7C may be performed in accordance with the teachings of U.S. patent application Ser. No. 12/876,418 entitled System For Fast, Probabilistic Skeletal Tracking, inventors Williams et al. filed Sep. 7, 2010, hereby fully incorporated by reference herein.

In step 812, m skeletal hypotheses are proposed using one or more computational theories using some or all the available information. One example of a stateless process for assigning probabilities that a particular pixel or group of pixels represents one or more objects is the Exemplar process. The Exemplar process uses a machine-learning approach that takes a depth image and classifies each pixel by assigning to each pixel a probability distribution over the one or more objects to which it could correspond. The Exemplar process is further described in U.S. patent application Ser. No. 12/454,628, entitled "Human Body Pose Estimation," which application is herein incorporated by reference in its entirety.

In another embodiment, the Exemplar process and centroid generation are used for generating probabilities as to the proper identification of particular objects such as body parts and/or props. Centroids may have an associated probability that a captured object is correctly identified as a given object such as a hand, face, or prop. In one embodiment, centroids are generated for a user's head, shoulders, elbows, wrists, and hands. The Exemplar process and centroid generation are further described in U.S. patent application Ser. No. 12/825,657, entitled "Skeletal Joint Recognition and Tracking System," and in U.S. patent application Ser. No. 12/770,394, entitled "Multiple Centroid Condensation of Probability Distribution Clouds." Each of the aforementioned applications is herein incorporated by reference in its entirety.

Next, in step 814, for each skeletal hypothesis, a rating score is calculated. In step 816, a set of n sampled skeletal hypotheses $X_t$ is filled from the m proposals of step 814. The probability that a given skeletal hypothesis may be selected into the sampled set $X_t$ is proportional to the score assigned in step 814. Thus, once steps 812-814 have been executed, proposals that were assigned a high probability are more likely to appear in the output set $X_t$ than proposals that were assigned a low probability. In this way $X_t$ will gravitate towards a good state estimate. One or more sample skeletal hypotheses from the sampled set $X_t$ (or a combination thereof) may then be chosen in step 818 as output for that frame of Captured data, or other time period.

Figure 8:
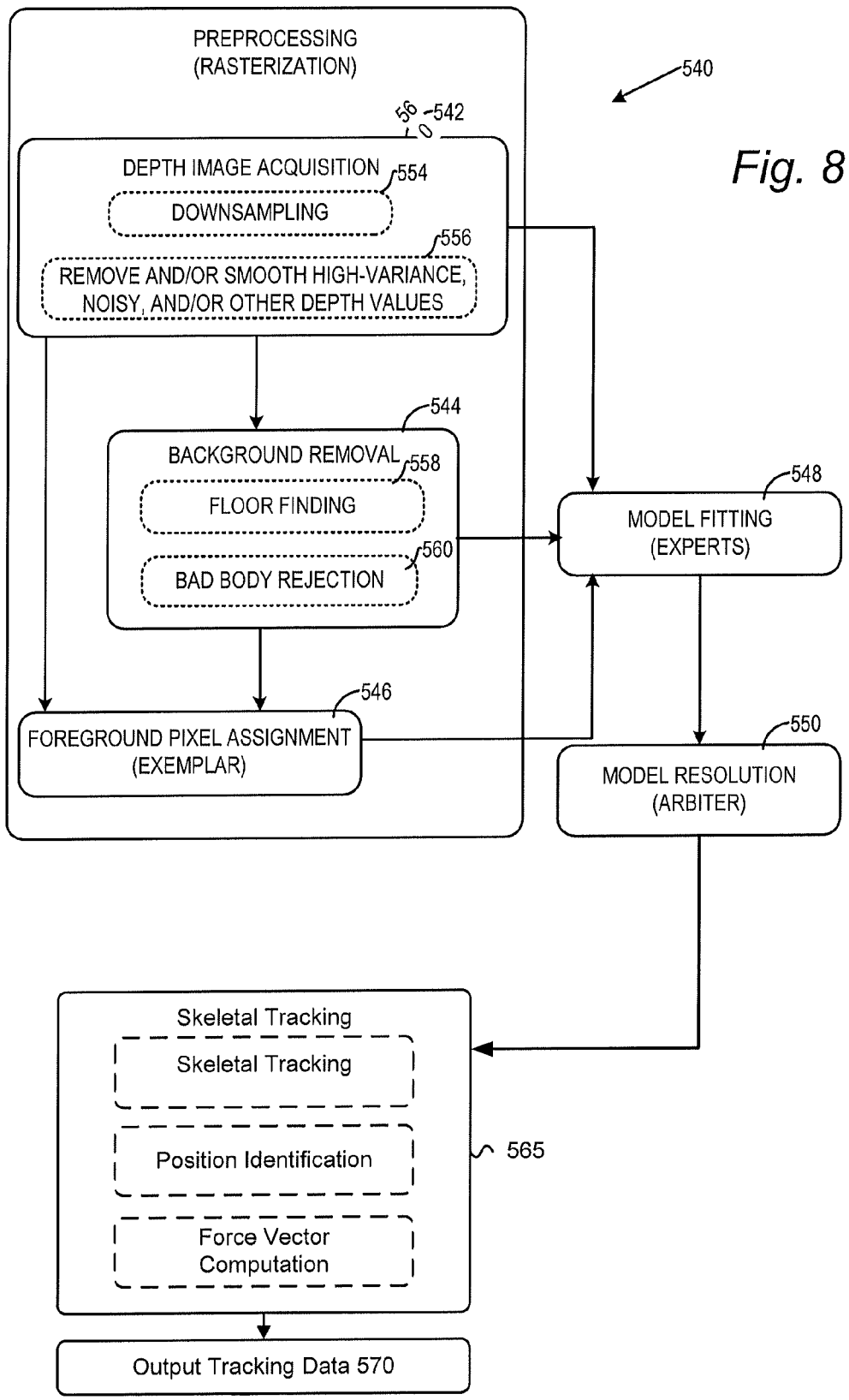
FIG. 8 shows a conceptual block diagram of a processing pipeline for tracking a target according to an embodiment of the present technology.

FIG. 8 shows a flow diagram of an example pipeline 540 for tracking one or more targets. Pipeline 540 may be executed by a computing system (e.g., computing environment 12) to track one or more players interacting with a gaming or other application. In one embodiment, pipeline 540 may be utilized n the target recognition, analysis, and tracking system as element 450 described above. Pipeline 540 may include a number of conceptual phases: depth image acquisition 542, background removal 544, foreground pixel assignment 546, model fitting 548 (using the one or more experts 594), model resolution 550 (using the arbiter 596), and skeletal tracking 560. Depth image acquisition 542, background removal 544, and foreground pixel assignment 546 may all be considered as part of the preprocessing of the image data.

Depth image acquisition 542 may include receiving an observed depth image of a target within a field of view from depth camera 26 of capture device 20. The observed depth image may include a plurality of observed pixels, where each observed pixel has an observed depth value.

As shown at 554 of FIG. 8, depth image acquisition 542 may optionally include downsampling the observed depth image to a lower processing resolution. Downsampling to a lower processing resolution may allow the observed depth image to be more easily utilized and/or more quickly processed with less computing overhead. One example of downsampling is to group the pixels into patches in a technique occasionally referred to as oversegmentation. Patches may be chosen to have approximately constant depth, and roughly equal world-space area. This means that patches further from the camera appear smaller in the image. All subsequent reasoning about the depth image may be expressed in terms of patches, rather than pixels. As indicated, the downsampling step 554 of grouping pixels into patches may be skipped so that the pipeline works with depth data from individual pixels.

As shown at 556 of FIG. 8, depth image acquisition 542 may optionally include removing and/or smoothing one or more high-variance and/or noisy depth values from the observed depth image. Such high-variance and/or noisy depth values in the observed depth image may result from a number of different sources, such as random and/or systematic errors occurring during the image capturing process, defects and/or aberrations resulting from the capture device, etc. Since such high-variance and/or noisy depth values may be artifacts of the image capturing process, including these values in any future analysis of the image may skew results and/or slow calculations. Thus, removal of such values may provide better data integrity and/or speed for future calculations.

Background removal 544 may include distinguishing human targets that are to be tracked from non-target, background elements in the observed depth image. As used herein, the term "background" is used to describe anything in the scene that is not part of the target(s) to be tracked. The background may for example include the floor, chair and plant 23 in FIGS. 3A and 3B, but may in general include elements that are in front of (i.e., closer to the depth camera) or behind the target(s) to be tracked. Distinguishing foreground elements that are to be tracked from background elements that may be ignored can increase tracking efficiency and/or simplify downstream processing.

Background removal 544 may include assigning each data point (e.g., pixel) of the processed depth image a value, which may be referred to as a player index, that identifies that data point as belonging to a particular target or to a non-target background element. When such an approach is used, pixels or other data points assigned a background index can be removed from consideration in one or more subsequent phases of pipeline 540. As an example, pixels corresponding to a first player can be assigned a player index equal to one, pixels corresponding to a second player can be assigned a player index equal to two, and pixels that do not correspond to a target player can be assigned a player index equal to zero. Such player indices can be saved in any suitable manner. In some embodiments, a pixel matrix may include, at each pixel address, a player index indicating if a surface at that pixel address belongs to a background element, a first player, a second player, etc. The player index may be a discrete index or a fuzzy index indicating a probability that a pixel belongs to a particular target and/or the background.

A pixel may be classified as belonging to a target or background by a variety of methods. Some background removal techniques may use information from one or more previous frames to assist and improve the quality of background removal. For example, a depth history image can be derived from two or more frames of depth information, where the depth value for each pixel is set to the deepest depth value that pixel experiences during the sample frames. A depth history image may be used to identify moving objects in the foreground of a scene (e.g., a human game player) from the nonmoving background elements. In a given frame, the moving foreground pixels are likely to have depth values that are different than the corresponding depth values (at the same pixel addresses) in the depth history image. In a given frame, the nonmoving background pixels are likely to have depth values that match the corresponding depth values in the depth history image.

As one non-limiting example, a connected island background removal may be used. Such a technique is described for example in U.S. patent application Ser. No. 12/575,363, filed Oct. 7, 2009, the entirety of which is hereby incorporated herein by reference. Additional or alternative background removal techniques can be used to assign each data point a player index or a background index, or otherwise distinguish foreground targets from background elements. In some embodiments, particular portions of a background may be identified. In addition to being removed from consideration when processing foreground targets, a found floor can be used as a reference surface that can be used to accurately position virtual objects in game space, stop a flood-fill that is part of generating a connected island, and/or reject an island if its center is too close to the floor plane. A technique for detecting a floor in a FOV is described for example in U.S. patent application Ser. No. 12/563,456, filed Sep. 21, 2009, the entirety of which is hereby incorporated herein by reference. Other floor-finding techniques may be used.

Additional or alternative background removal techniques can be used to assign each data point a player index or a background index, or otherwise distinguish foreground targets from background elements. For example, in FIG. 8, pipeline 540 includes bad body rejection 560. In some embodiments, objects that are initially identified as foreground objects can be rejected because they do not resemble any known target. For example, an object that is initially identified as a foreground object can be tested for basic criteria that are to be present in any objects to be tracked (e.g., head and/or torso identifiable, bone lengths within predetermined tolerances, etc.). If an object that is initially identified as being a candidate foreground object fails such testing, it may be reclassified as a background element and/or subjected to further testing. In this way, moving objects that are not to be tracked, such as a chair pushed into the scene, can be classified as background elements because such elements do not resemble a human target. Where for example the pipeline is tracking a target user 18, and a second user enters the field of view, the pipeline may take several frames to confirm that the new user is in fact human. At that point, the new user may either be tracked instead of or in addition to the target user.

After foreground pixels are distinguished from background pixels, pipeline 540 further classifies the pixels that are considered to correspond to the foreground objects that are to be tracked. In particular, at foreground pixel assignment 546 of FIG. 8, each foreground pixel is analyzed to determine what part of a target user's body that foreground pixel is likely to belong. In embodiments, the background removal step may be omitted, and foreground object determined other ways, for example by movement relative to past frames.

Once depth image acquisition 542, background removal 544 and foreground pixel assignment 546 have been completed, the pipeline 540 performs model fitting 548 to identify skeletal hypotheses that serve as machine representations of a player target 18, and model resolution 550 to select from among these skeletal hypotheses the one (or more) hypotheses that are estimated to be the best machine representation of the player target 18. The model fitting step 548 is performed in accordance with, for example, U.S. patent application Ser. No. 12/876,418 entitled System For Fast, Probabilistic Skeletal Tracking, inventors Williams et al. filed Sep. 7, 2010, cited above.

In general, at 565 the target recognition, analysis, and tracking system tracks the configuration of an articulated skeletal model. Upon receiving each of the images, information associated with a particular image may be compared to information associated with the model to determine whether a movement may have been performed by the user. For example, in one embodiment, the model may be rasterized into a synthesized image such as a synthesized depth image. Pixels in the synthesized image may be compared to pixels associated with the human target in each of the received images to determine whether the human target in a received image has moved.

According to an example embodiment, one or more force vectors may be computed based on the pixels compared between the synthesized image and a received image. The one or more force may then be applied or mapped to one or more force-receiving aspects such as joints of the model to adjust the model into a pose that more closely corresponds to the pose of the human target or user in physical space.

According to another embodiment, the model may be adjusted to fit within a mask or representation of the human target in each of the received images to adjust the model based on movement of the user. For example, upon receiving each of the observed images, the vectors including the X, Y, and Z values that may define each of the bones and joints may be adjusted based on the mask of the human target in each of the received images. For example, the model may be moved in an X direction and/or a Y direction based on X and Y values associated with pixels of the mask of the human in each of the received images. Additionally, joints and bones of the model may be rotated in a Z direction based on the depth values associated with pixels of the mask of the human target in each of the received images.

Figure 9A:
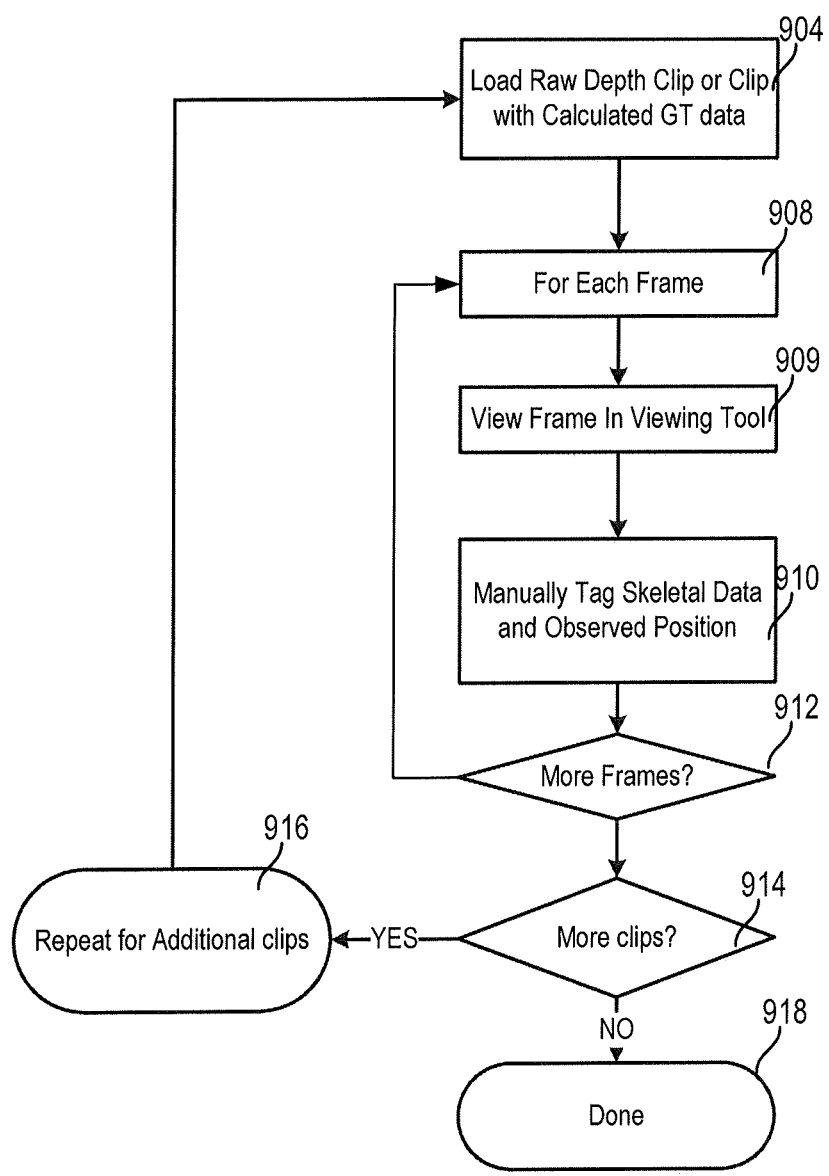
FIG. 9A is a flowchart illustrating one embodiment for creating ground truth data from a depth clip by manually tagging skeletal data.
Figure 9B:
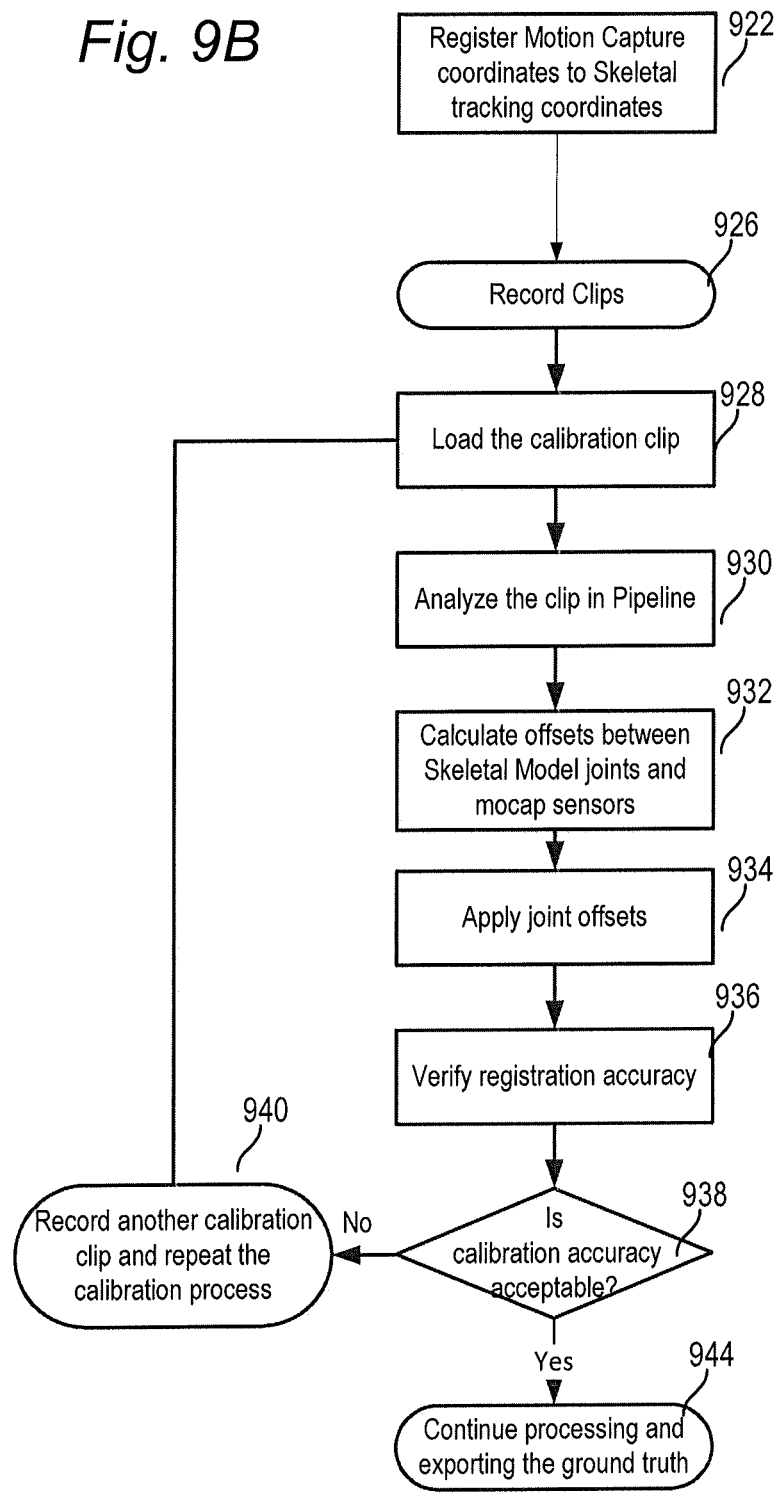
FIG. 9B is a flowchart illustrating another embodiment for creating ground truth data for a test clip using calibrated sensors.

FIG. 9A and FIG. 9B illustrate a process for creating test data and associated ground truth in accordance with step 166 of FIG. 1, above. As noted above, one embodiment for providing depth clip data with associated ground truth is to manually mark the depth clip data.

FIG. 9A illustrates a method for manually annotating the depth data. At 904, a raw depth clip of subject movements or a depth clip with calculated ground truth is loaded. For manually tagged clips, the manual process can then either generate all of the ground truth by annotating a raw depth clip, or modify the ground truth data to match the desired skeletal model. At 904, the depth clip is loaded into an analysis interface In accordance with the method of FIG. 9A, for each frame 908, a user views the skeletal model coordinates relative to the depth data at 909 in a viewer, and manually tags skeletal data for the skeletal processing pipeline based on what is visually perceptible to a user at 910. If the ground truth data exists, step 910 may involve identifying offsets between existing ground truth and observed ground truth. After each frame in a particular clip has been completed at 912, if additional clips are available at 914, another calibration clip is loaded and the process repeated at 916. If so, then additional processing of additional clips can continue at step 918.

FIG. 9B illustrates an alternative process for creating ground truth wherein a motion capture system is used in conjunction with a depth clip to create ground truth. At 922, the motion capture system registers the positions of sensors with the location at which real "joints" on a subject are expected to be. Where active sensors are used to record motion capture data, at 922, a calibration is made between the coordinate space of the motion capture sensor and the specific joint associated with the sensor, resulting in an offset between the sensor and the joint. These offsets can be used to calibrate the recording of the motion capture data and automatically correlate the data to the skeletal ground truth. Each sensor provides position and orientation, from which the translation from that sensor to one or more joints in the sensor's coordinate space can be computed. For all motion capture there is a registration between the motion capture and the depth camera. The registration process is illustrated in FIG. 10.

A depth clip and motion capture clip are recorded simultaneously at 926 and a calibration clip loaded at 928. The depth clip is analyzed in the target recognition, analysis, and tracking pipeline at 930 and offsets between the pipeline-identified joints, and the motion capture sensor coordinate system positions are calculated at 932 Offsets are applied to the depth clip at 934. Any offset in distance, direction, force, or motion can be determined at step 932 and the difference used to determine the calibration accuracy at 936. The registration accuracy is verified at 936 and may comprise a qualitative assessment of accuracy that the person processing the clip makes. If the accuracy is acceptable at 938, the processing continues. If the accuracy is not acceptable at 940, then additional calibration clips are recorded at 940.

FIG. 10 illustrates a process for registration of the coordinate space of the motion capture system to depth capture coordinate space, used in step 922 of FIG. 9A or 9B. The registration accuracy is the quantification of the discrepancy between a tracked skeletal model of the subject by the pipeline and the motion capture detected positions. In one implementation, at step 1010, test data is created using a motion capture sensor which is held facing a depth sensor and waved around in the physical environment within view of the motion capture system and the depth sensor. The motion capture system will determine the motion caption sensor position using its own technology in a local coordinate space of the motion capture system 1020, and the depth sensor illustrated above as respect to FIG. 4 will determine the closest point to the sensor at 1014. A set of points in the motion capture coordinate space from the tracked sensor of the motion capture device) and a set of points in the depth capture coordinate space are used to calculate a transformation matrix that correlates the two sets of points at 1040. Any subsequently recorded motion capture data applies the registration to the motion capture sensors to transform them into depth camera space. Using this matrix, subsequently recorded motion data can be corrected for ground truth in accordance with FIGS. 9A and 9B.

Figure 11:
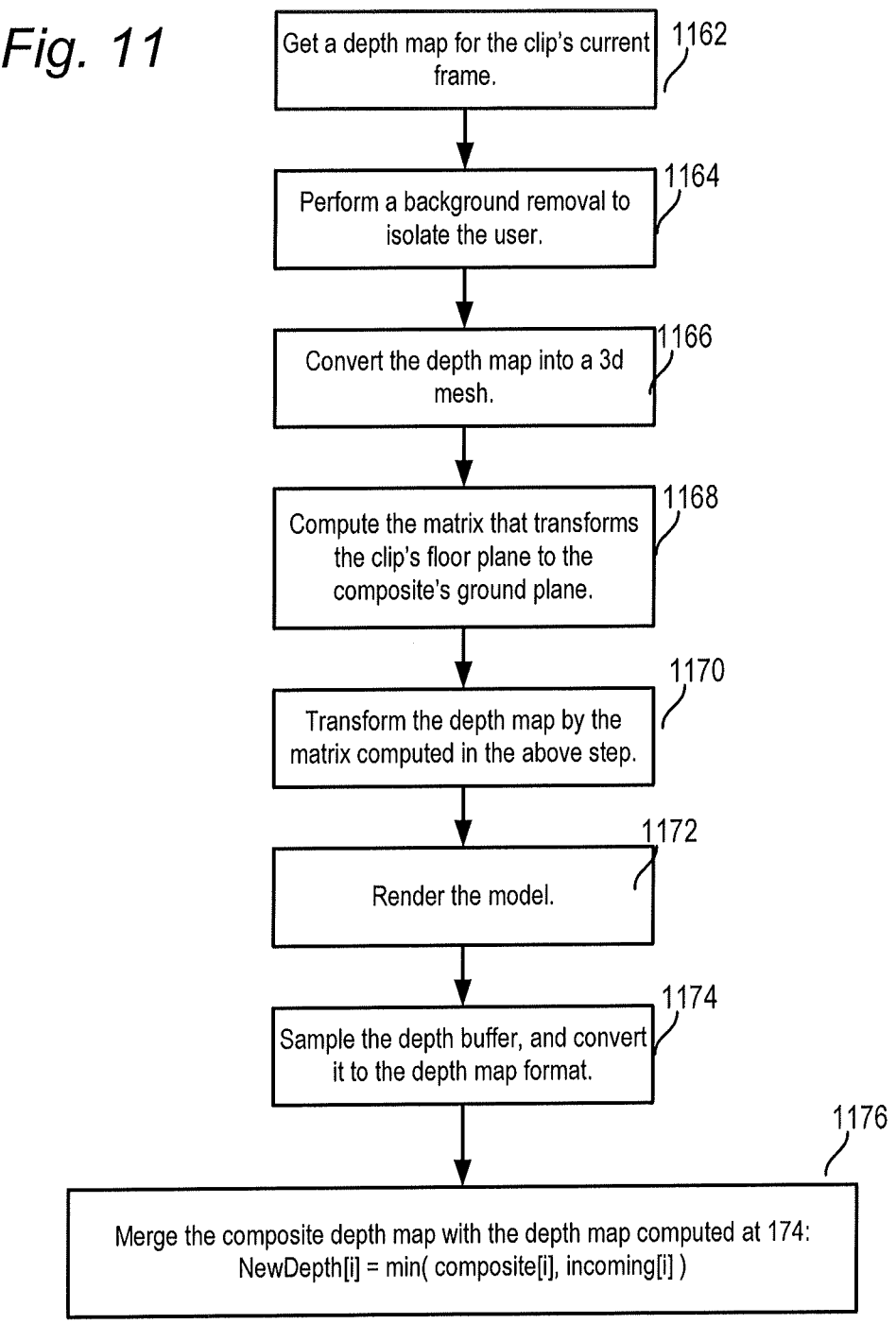
FIG. 11 is a flow chart illustrating synthesis of two depth clips to create a depth map composite.

As noted above, there may be situations where test data for a particular scenario does not exist. FIGS. 11 and 12 illustrate synthesis of combined depth data. Synthesis of new test data takes place using depth clip information and associated ground truth, if it exists with the depth clip.

Figure 12C:
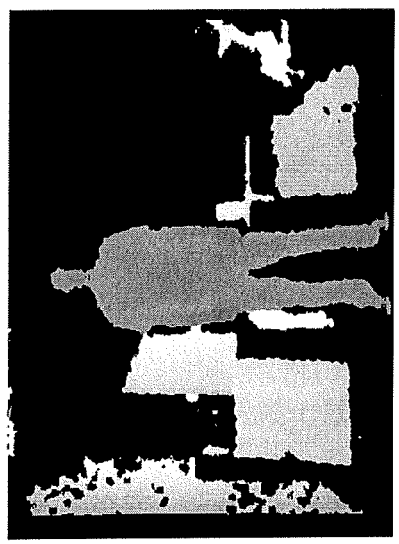
FIG. 12A-12J is a representation of the compositing steps illustrated in FIG. 11.
Figure 12A:
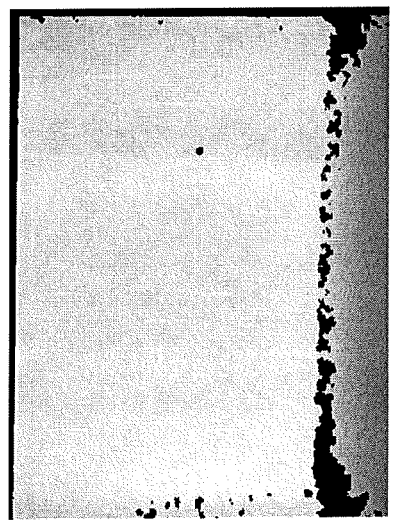
Figure 12D:
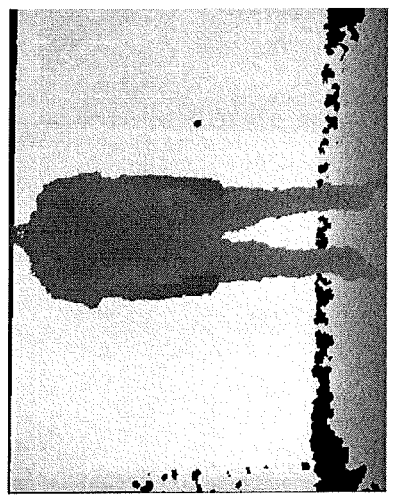
Figure 12B:
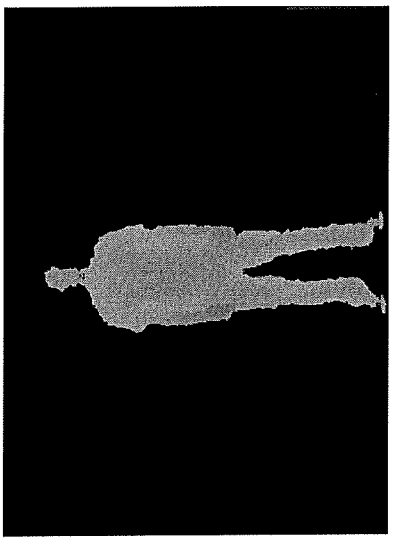

In order to composite one or more depth clips, potentially with associated ground truth, into a single scene, a user starts with a base clip, of a room, for example as shown in FIG. 12A. As noted above, the room must include a floor and may include other objects, walls etc. . . . . The room shown in FIG. 12A is a depth map image of the exemplary room shown in FIG. 3A. As illustrated in FIG. 12B, the creator adds a new clip to be composited to the scene by first removing the background artifacts from the new clip as illustrated in FIG. 12C.

As illustrated in FIG. 11, the steps illustrated in FIGS. 12A-12C may be performed by first retrieving a depth map for the clip's current frame at 1162. At 1164, a background removal process is utilized to isolate the user in the frame. In one embodiment, background removal is performed manually by removing the floor via floor detection, and then providing a bounding box that separates the user from the depth map. Alternatively we could use other background removal algorithms such as those described in U.S. patent application Ser. No. 12/575,363 entitled "Systems And Methods for Removing A Background Of An Image.", filed Oct. 7, 2009, fully incorporated herein by reference. FIG. 12B illustrates the user isolated in a scene.

At step 1166, the depth map is converted to a three dimensional mesh. The three dimensional mesh allows transformation of the clip floor plane into the ground plane of the composite clip at 1168. Coordinate matching may be used for this purpose. The matrix and transforms of the clips floor plane and the composite ground layer computed at 1168. The transformation uses the floor plane and ground layer of the respective clips to complete transformation mapping.

At step 1170, the depth map of each frame in a clip is transformed by the matrix computed in step 1168. At step 1172, the model of a composite scene is rendered. One such composite scene is illustrated in FIG. 12D, and another in FIG. 12H. At step 1174, the depth buffer is sampled and converted to the depth map format. At 1176, the composite depth map with depth map computed at 174 is merged to complete a composite clip. If the new clip contained ground truth data, this data is transformed by the same matrix, thereby producing new ground truth in the composite clip.

FIG. 12B illustrates a depth map image of the new clip added to the scene, and FIG. 12C illustrates a human user in the scene without removal of the background image. Next, a new clip is inserted into the synthetic scene as illustrated in FIG. 12D and discussed above. The position of the user in the new clip is provided by translating the isolated foreground image of the user based on the transformation matrix to the target image's reference frame. The position of the new clip within the base clip can then be set as illustrated in FIG. 12E. (Notice the user moves between position illustrated in FIG. 12B and that illustrated in FIG. 12E.)

Figure 12G:
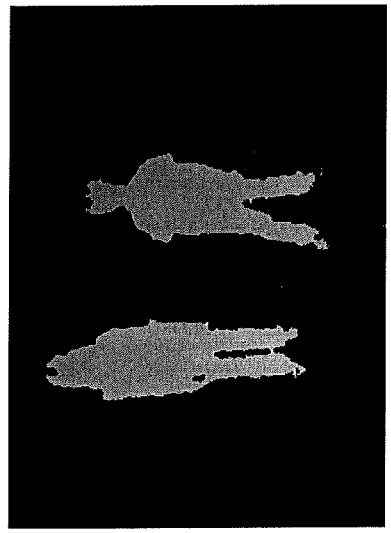
Figure 12H:
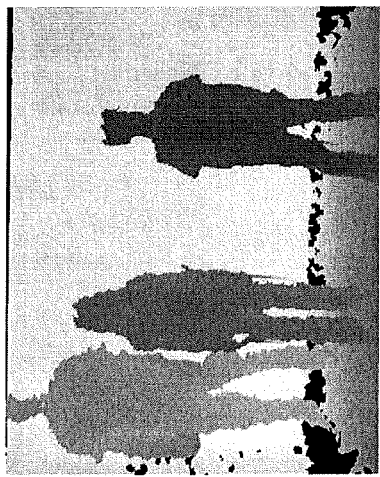
Figure 12E:
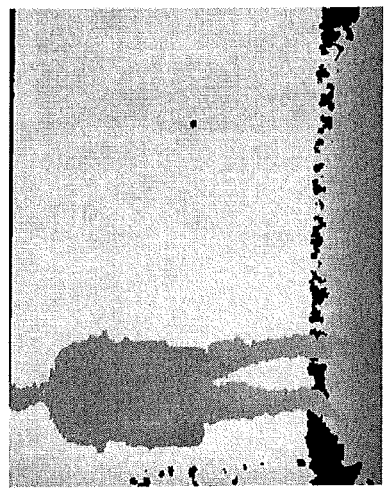
Figure 12F:
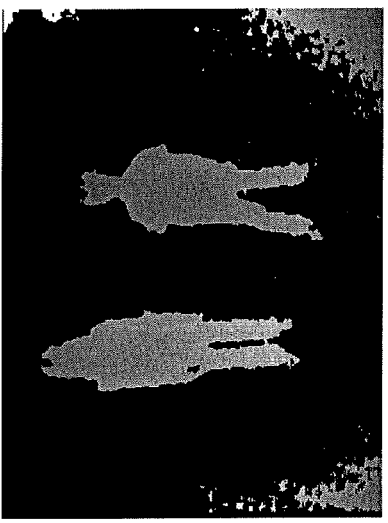
Figure 12J:
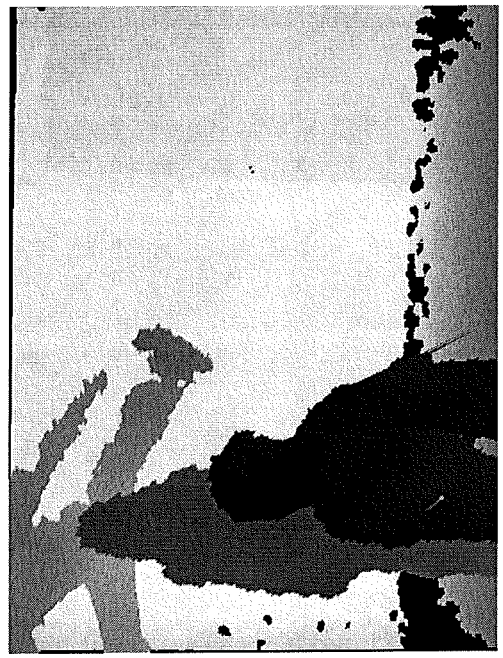
Figure 12I:
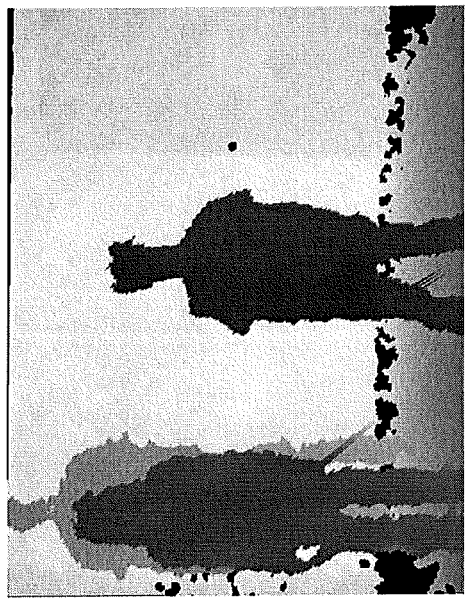

The steps discussed above may be repeated another new clip by adding two children to the scene in FIG. 12F, and isolating the background artifacts from the new clip in FIG. 12G. In FIG. 12H, the new clip foreground—the figures of the children—are inserted into the scene as illustrated and positions the users within the scene as illustrated in FIG. 12I. Next, a full playback of the synthetic clip with all of the various users in the background scene as illustrated in FIG. 12J.

It should be understood that any type of depth data—whether captured or synthesized—may be used in the above synthesis process. That is, real world depth capture of users may be used with computer generated objects and composited in a scene. Such objects can be used, for example, to test for motion where portions of the user may be concealed from the capture device. In addition, users can sequence input clips to occur at defined times and to play for defined durations in the synthetic scene.

FIG. 13 is a process illustrating the step of annotating the depth clip discussed above in FIG. 1B at step 174. At step 1302, for each depth clip available at step 1304, bounded metadata is assigned and attached with the clip. Bounded metadata may include for example, those listed in the table below. It should be recognized that the metadata assigned to test data may occur on recording of the data, upon analysis of the data, or at any point before or after test data has been inserted into the data repository.

The primary goal of metadata collection is ultimately to aid developers in tracking down problem scenarios and poses. Once they have identified an issue with a clip, they will be able to find other clips with similar features to test for common causes. An additional goal is to provide valuable information as part of reporting. Version, firmware version, driver version, date/time, platform, etc.) can be automatically determined and minimizes input generally and reduces the risk of error.

Table 1 illustrates the various types of metadata which may be associated with test data:

| Item | Bounds | Description |
| --- | --- | --- |
| Active player count | 1-4 | Number of Players in Environment |
| Inactive player count | 0-4 | Number of Players in Environment |
| Pets | 0-4 | Animals in Environment |
| Weight | 0-400 | Weight in pounds |
| Gender | M/F | |
| Height | 0-96 | Height in inches |
| Body Type | Small, Petite, Normal, Heavy | Body type can be reflected as descriptive or relative to a BMI score |
| Disabilities | T/F | |
| Disabilities Description | Free Text | Freeform entry describing disabilities. |
| Hair Length/Style | Short, neck length, shoulder length, beyond shoulder | Hair description |
| Facial Hair | None, Short Beard, Long Beard | Facial hair description |
| Skin Tone | Pale, Light, Olive, Tan, Brown, Very Dark | |
| Subject ID | Alphanumeric ID | Identifier used to track subjects |
| Sitting | T/F | User position |
| Sideways | T/F | User position |
| Laying Down | T/F | User position |
| Clothing | Pants, Long dress, Short dress, Jacket/Coat, Hat, Flowing | Multiple selections OK |
| Clothing Materials | Normal, Shiny, IR absorbent | |
| Relation to Camera | Freeform Text Descriptor | |
| Lighting | Incandescent; Florescent; Natural; Bright Sunshine | Could this be a list? |
| Occlusion | Full, partial | Amount subject is obscured |
| Noise | Percentage Thresholds | Clarity of the depth image. |
| Camera Tilt | −90-90 | Camera tilt in degrees from level |
| Camera Height | 0-72 | Camera height from the floor in inches |
| Camera Hardware Version | | Capture automatically |
| Camera Firmware Version | | Capture automatically |
| Camera Driver Version | | Capture automatically |

-continued

| Item | Bounds | Description |
| --- | --- | --- |
| Capture Platform | Console, PC | Capture automatically |
| Clip file name | | |
| Date/Time captured | | Capture automatically |
| Has GT | T/F | |
| Type | Real, Synthetic | |
| Description | Free Form Text Field | |
| Testable | T/F | Default to False. |
| Testable Reason | Feature not yet supported, Not tagged, Not reviewed, Known issue | Rationale for the test clip. |
| Poses/Gestures | [depends on application] | Pre-defined poses and gestures used in application and game testing. |

Additionally, a quality control process may be performed on the ground truth to ensure that all the metadata illustrated in the metadata attached to the ground truth and the associated clip is accurate. For each frame in the depth clip, the computed position of a particular joint in the pipeline may be compared with the ground truth position established and the ground truth data associated with the clip. If correction is required then the position of the element can be manually reset using a marking tool. Once the entire clip is annotated, the clip is saved.

FIG. 14 illustrates a process for providing an executed analysis 232 on a pipeline, which may be performed as that illustrated in FIG. 2 by an analysis engine 200. At step 1402, the test data is acquired and fed to each of the processing pipelines at 1404. The processing pipeline runs the data at 1406 under the control of the job manager and outputs the results to a log file that is then used as input to the analysis engine which calls the metrics plugins to do the comparison between tracked results and ground truth. The analysis currently stores some of the core analysis comparisons in a file, so build versus build comparisons can be performed fairly quickly. For each frame of tracked data at 1408, tracked joint information is stored at 1412. The metrics engines provide various measures of the difference between the ground truth and the pipeline's computed tracking location or orientation of the joint. This continues for each frame of a depth clip fed to a processing pipeline at 1414. When the frames in the clip have completed, the process continues in each pipeline at 1416. It should be understood that steps 1404 through 1416 can be performed simultaneously in multiple pipelines in multiple executing devices. At step 1418, for each metric for which a result is to be computed, an individual metric computation is performed. At 1420, metric results are output and at 1422, summary reports are output.

An illustration of exemplary metrics may be provided by the system as described below with respect to Table 2. As indicated above, the number and types of metrics which may be used to evaluate the performance of the pipeline is relatively limitless.

Exemplary metrics which may be utilized are illustrated in Table 2:

| Metric | Explanation |
| --- | --- |
| Distance | Euclidean distance between individual points in the tracked model is calculated in a Weighted Bin Summary. |
| Angle | A determination of the relative angles between related joints and limbs is |

| Metric | Explanation |
| --- | --- |
| | provided in, for example, a weighted bin summary. The angle is computed between bones in a human model. |
| Hybrid Distance and Angle - Joint distance error, bone angle error, and bone dimension error, and considering a variety of possible tracking "skeleton" configurations - including the number of segments ("bones"), joints, and various body dimensions. | A metric that combines the errors of a number of body feature measurements, including, but not limited to, Combining these factors provides a result that measures error more consistently. Use distance for specific position sensitive joints like the shoulders and wrists and use angle for the other bones. |
| Angle Worst | This metric compares the angle between the tracked body segment from the sensor and the body segment from the verifiable test data and keeps the worst segment per frame per player. |
| Avg. Angle Worst | Average of the worst angle is provided. |
| StdDev of Angle Worst | Standard deviation of the Angle worst. |
| Visibility | Not currently reported although it is captured in the result files. Find a way to verify GT visibility and ensure the tracked visibility doesn't contradict it. |
| Players Tracked | The number of players tracked per frame. GT frames will be validated for the number of players tracked in that frame. |
| Crumple Detection | Bones will expose its bAlmostLost member. This is a good indicator that the skeleton is crumpled. There is no impact to ground truth as the subject should never crumple in the clip. |
| Bone Length | Can be used to test body scan. Doing tests currently, but need to add reports. |
| GT Frames vs Total Frames | Count of the number of GT frames and the total frames in the clip. Already in the summary. |
| Bucket Weighted Error - Various Body Features including Joint and Bone Positions | For each frame, create a vector of bucket sizes. For a set of frames, the bucket sizes of all frames, for each bucket are added. After all errors are counted, a single score can be computed by weighting each bucket count and summing the results. The convex weight increase causes the score to dramatically increase as more errors fall into the larger buckets. Ideally all errors would be in bucket 1 as that should represent that all features are within an acceptable error threshold. These weights and bucket thresholds can be tuned as appropriate to the product. The Bucket Weighted Errors are normalized by dividing the score by the number of features and translating it to the range of 0 to 100 where 100 is the worst and zero is the best. |
| Distance RMS. | This metric is based on the root mean squared (RMS) for all the body feature distance errors. The exact set of body features to be considered could vary based on the needs of the product. |
| Machine Learning | To analyze accuracy in body type identification: for each body pixel, a body part labeling is assigned and verified relative to verified accurate ("ground truth") labeling. The statistics related to correct identification of the body parts is based on the percentage of pixels labeled as corresponding to each body part, and the entire body. Averages of the entire percentage correct can be calculated across s all frames in a clip, a subject, and the entire data set, providing successive measures of accuracy. |
| Image Segmentation. | Evaluates the error for each frame in a stream of images with regards to image segmentation by comparing frame pixels to a player segmentation ground truth image with no players, only the environment. This metric identifies false positives and false negatives for image segmentation. False positives are defined as pixels that get classified as the player but is in fact part of the environment, whereas false negatives are defined as pixels that get classified as the environment but is in fact part of a player. A normalized weighted bucket error is used to come up with an easy to understand % error number. Two methods are used for the weighted bucketization, a local error and global error. The local error is a simple per pixel error whereas the global error operates on groups of pixels, e.g. a block of 16×16 pixels. |
| Floor Error. | This metric compares the computed floor to the ground truth data and produces several error measurements. It reports the angle between the normals of the computed and ground truth floor planes, as well as the difference between the distance component of those planes. It also tracks the number of frames it takes the computed floor to converge on a particular plane, and whether or not it converges on a plane similar to the ground truth plane. |

In addition, a facility is provided to identify which images were used from the machine learning process to classify the body parts in a given frame or pose—thus providing information on how the system came to the conclusions being presented in the final result. In this example, "similar" is defined by using a threshold and determining skeletal distance between the frame under examination and a machine learning training image, returning the most similar ones that fit within the defined threshold. A weighted average is computed based on the number of images that are within various additional threshold points and that weighted average is used to derive a "popularity score". This score indicates how popular this pose is in the training set. Typically, a popular pose should be well supported by machine learning and has a good exemplar metric score also. If one frame has low metric score and low popularity score, it can be determined that that training set does not support this pose well. If the metric score is low but the popularity score is high, this indicates a potential defect in the training algorithm.

Another issue is the need for very fast search and comparison across millions of training images. To meet this requirement, a cluster algorithm groups all images into clusters and images within the cluster are within a certain distance to the cluster center. When the images are searched, a comparison between the skeleton from the frame being investigated is made with each cluster center. If the distance to the center is too far away, the entire cluster can be skipped. This cluster algorithm can improve the processing time by an order of magnitude. The data file formats are also optimized for high performance in this searching function, having a direct mapping of their records.

In one embodiment, summary reports of the metrics are provided. A suitable high-level summary that quickly and accurately conveys build improvement versus regression using the previously mentioned metrics and potential filtering by stable and unstable clips is valuable to developers. Along with the high-level summary the administrative UI 210 allows drill down reports that enable the developer to quickly identify the trouble clips and frames. Types of summaries which are available include those discussed below in Table 3:

| Report Type | Description |
|---|---|
| Subject Level Summary | A summary intended for developers to find the top improvements and regressions using the formula respectively: ((BEb − BE1 > 5) && (BEb > BE1 * 1.2) \|\| ((BEb − BE1 > 2) && (BEb > BE1 * 1.5) ((BE1 − BEb > 5) && (BE1 > BEb * 1.2) \|\| ((BE1 − BEb > 2) && (BE1 > BEb * 1.5) |
| Weighted Bin Summary | Used to just convey whether a build is better or not by sorting all errors into a set of predefined buckets that each represents an error range i.e. for distance it could be 0-5 cm etc. The number of errors for each bucket is then multiplied by a weight for that bucket and then all bucket results are summed to produce an error score. Lower being better. |
| Hybrid Metric Summary | A summary of the hybrid metrics identified above in Table 2 |

It will be understood that the aforementioned summaries are illustrative only.

Figure 15:
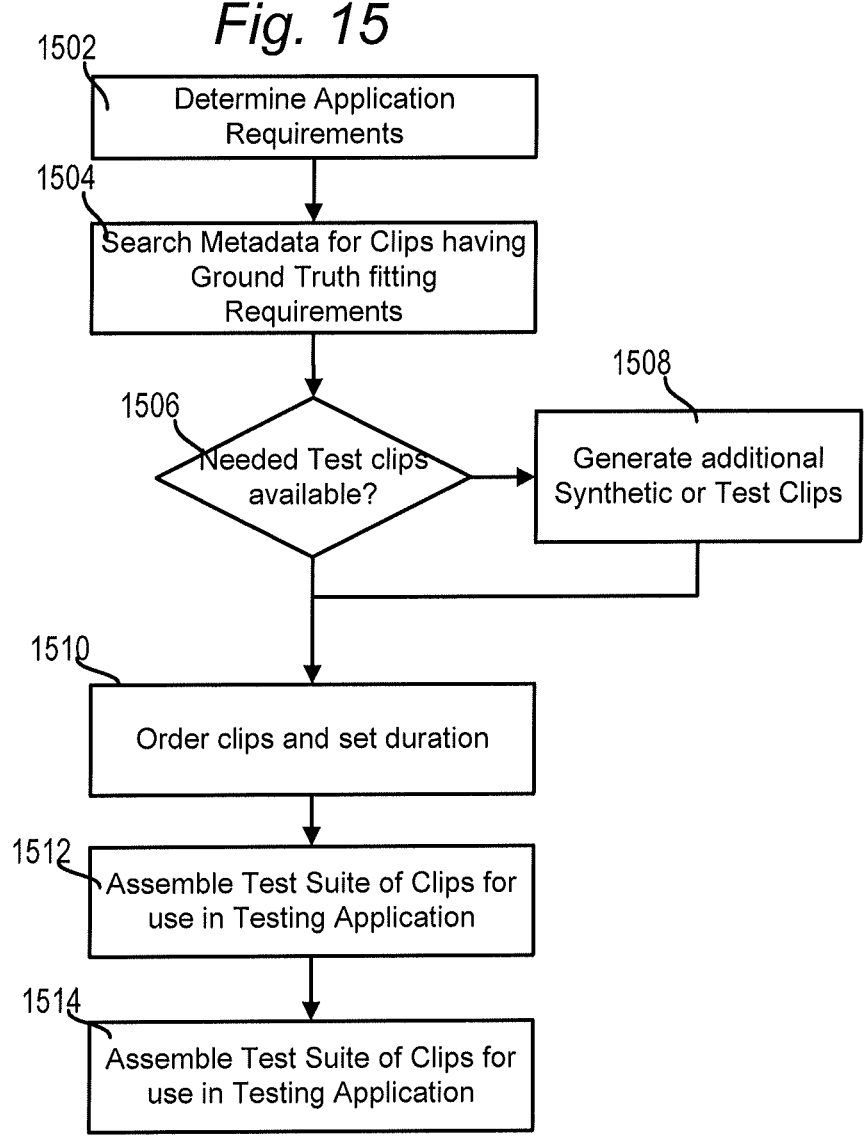
FIG. 15 is a flowchart illustrating the creation of a test suite.

FIG. 15 illustrates a process for creating a test suite in accordance with the discussion set forth above. At 1502, a developer will determine specific application requirements which are necessary to develop one or more applications. One example discussed above is a tennis game application which will require specific types of user movements be detected with much greater accuracy than other movements. At 1504, a developer can search through the metadata for associated test data having ground truth fitting the requirements of motion needed for the particular application. At 1506, the needed test data can be acquired. If specific test data meeting certain criteria are not available, then additional synthetic or test clips can be created at 1508. At 1510, the test data can be ordered and the duration of each clip set to play for a particular duration.

At 1512, the test suite is assembled for use in testing application and at 1514, the suite is sent to the pipeline for execution.

Figure 16:
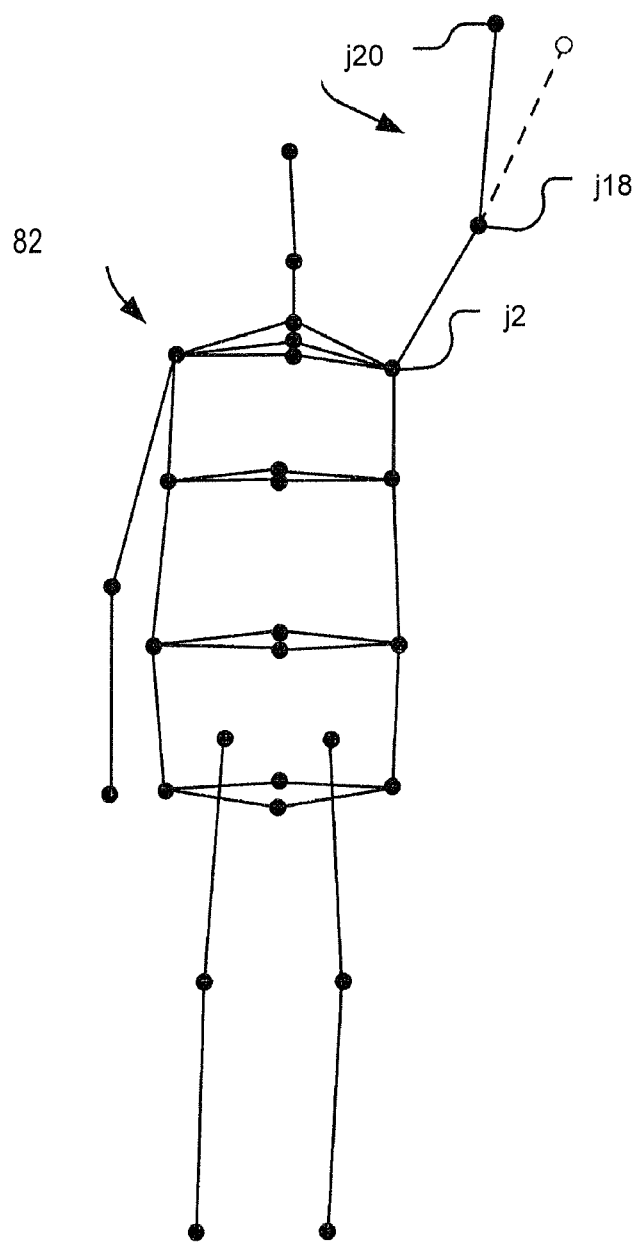
FIG. 16 illustrates a model being moved.

FIG. 16 illustrates an example embodiment of a model being adjusted based on movements or gestures by a user such as the user 18.

As noted herein a user may be tracked and adjusted to form poses that may be indicative of the user waving his or her left hand at particular points in time. The movement information which is later associated with joints and bones of the model 82 for each of the poses may be captured in a depth clip.

Frames associated with the poses may be rendered in the depth clip in a sequential time order at the respective time stamps. For frames at respective time stamps where a human user annotating a model determines that the position of a joint or reference point j1-j18 is incorrect, the user may adjust the reference point by moving the reference point as illustrated in FIG. 16. For example, in FIG. 16, point j12 is found to have been located in an incorrect location relative to a correct position (illustrated in phantom).

Figure 17:
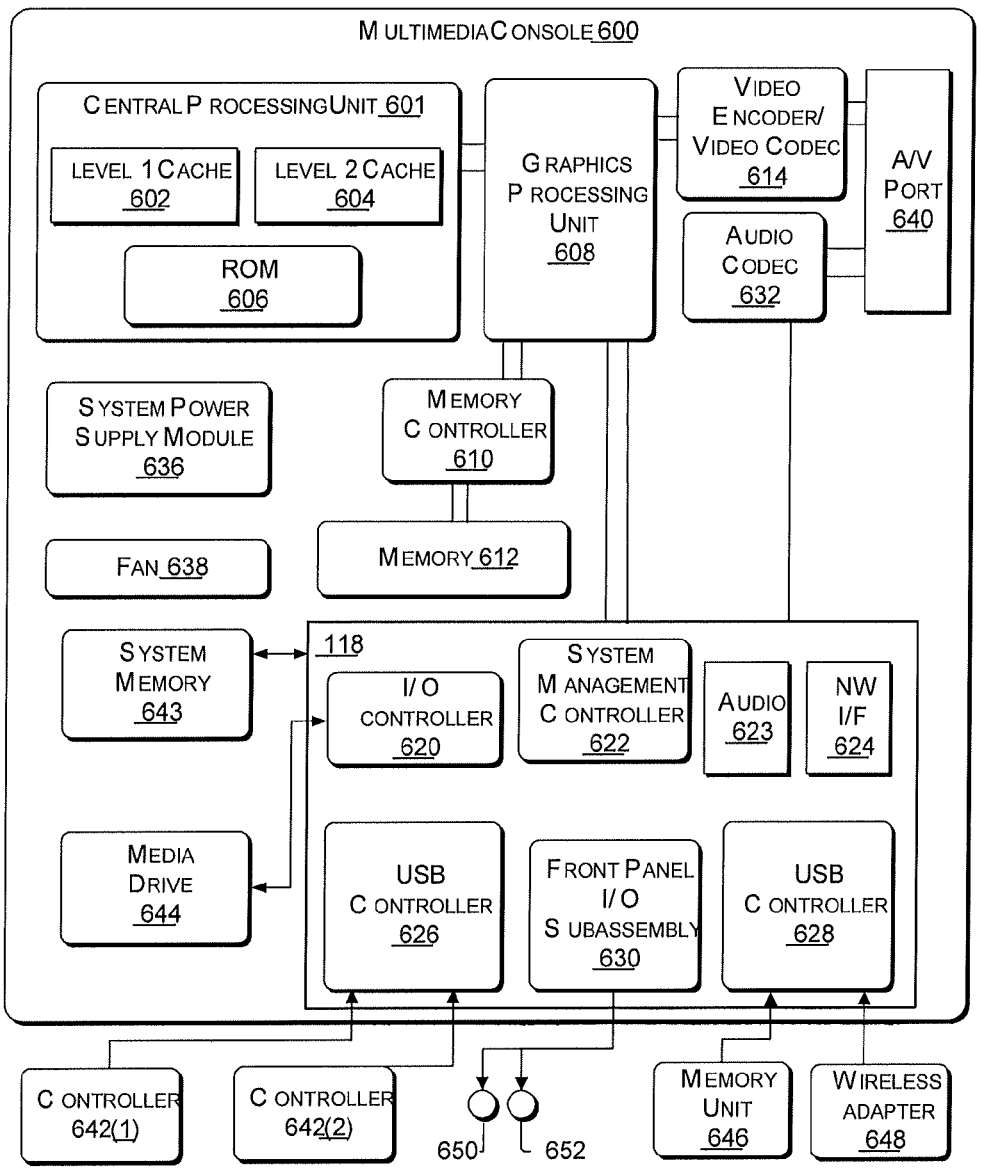
FIG. 17 is an exemplary computing environment suitable for use in the present technology.

FIG. 17 illustrates an example embodiment of a computing environment that may be used to interpret one or more positions and motions of a user in a target recognition, analysis, and tracking system. The computing environment such as the computing environment 12 described above with respect to FIGS. 3A-4 may be a multimedia console 600, such as a gaming console. As shown in FIG. 17, the multimedia console 600 has a central processing unit (CPU) 601 having a level 1 cache 602, a level 2 cache 604, and a flash ROM 606. The level 1 cache 602 and a level 2 cache 604 temporarily store data and hence reduce the number of memory access cycles, thereby improving processing speed and throughput. The CPU 601 may be provided having more than one core, and thus, additional level 1 and level 2 caches 602 and 604. The flash ROM 606 may store executable code that is loaded during an initial phase of a boot process when the multimedia console 600 is powered ON.

A graphics processing unit (GPU) 608 and a video encoder/video codec (coder/decoder) 614 form a video processing pipeline for high speed and high resolution graphics processing. Data is carried from the GPU 608 to the video encoder/video codec 614 via a bus. The video processing pipeline outputs data to an A/V (audio/video) port 640 for transmission to a television or other display. A memory controller 610 is connected to the GPU 608 to facilitate processor access to various types of memory 612, such as, but not limited to, a RAM.

The multimedia console 600 includes an I/O controller 620, a system management controller 622, an audio processing unit 623, a network interface controller 624, a first USB host controller 626, a second USB host controller 628 and a front panel I/O subassembly 630 that are preferably implemented on a module 618. The USB controllers 626 and 628 serve as hosts for peripheral controllers 642(1)-642(2), a wireless adapter 648, and an external memory device 646 (e.g., flash memory, external CD/DVD ROM drive, removable media, etc.). The network interface 624 and/or wireless adapter 648 provide access to a network (e.g., the Internet, home network, etc.) and may be any of a wide variety of various wired or wireless adapter components including an Ethernet card, a modem, a Bluetooth module, a cable modem, and the like.

System memory 643 is provided to store application data that is loaded during the boot process. A media drive 644 is provided and may comprise a DVD/CD drive, hard drive, or other removable media drive, etc. The media drive 644 may be internal or external to the multimedia console 600. Application data may be accessed via the media drive 644 for execution, playback, etc. by the multimedia console 600. The media drive 644 is connected to the I/O controller 620 via a bus, such as a Serial ATA bus or other high speed connection (e.g., IEEE 1394).

The system management controller 622 provides a variety of service functions related to assuring availability of the multimedia console 600. The audio processing unit 623 and an audio codec 632 form a corresponding audio processing pipeline with high fidelity and stereo processing. Audio data is carried between the audio processing unit 623 and the audio codec 632 via a communication link. The audio processing pipeline outputs data to the A/V port 640 for reproduction by an external audio player or device having audio capabilities.

The front panel I/O subassembly 630 supports the functionality of the power button 650 and the eject button 652, as well as any LEDs (light emitting diodes) or other indicators exposed on the outer surface of the multimedia console 600. A system power supply module 636 provides power to the components of the multimedia console 600. A fan 638 cools the circuitry within the multimedia console 600.

The CPU 601, GPU 608, memory controller 610, and various other components within the multimedia console 600 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 600 is powered ON, application data may be loaded from the system memory 643 into memory 612 and/or caches 602, 604 and executed on the CPU 601. The application may present a graphical user interface that provides a consistent user experience when navigating to different media types available on the multimedia console 600. In operation, applications and/or other media contained within the media drive 644 may be launched or played from the media drive 644 to provide additional functionalities to the multimedia console 600.

The multimedia console 600 may be operated as a standalone system by simply connecting the system to a television or other display. In this standalone mode, the multimedia console 600 allows one or more users to interact with the system, watch movies, or listen to music. However, with the integration of broadband connectivity made available through the network interface 624 or the wireless adapter 648, the multimedia console 600 may further be operated as a participant in a larger network community.

When the multimedia console 600 is powered ON, a set amount of hardware resources are reserved for system use by the multimedia console operating system. These resources may include a reservation of memory (e.g., 17 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of the application resolution. A scaler may be used to set this resolution such that the need to change frequency and cause a TV resynch is eliminated.

After the multimedia console 600 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 601 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 642(1) and 642(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches. The cameras 26, 28 and capture device 20 may define additional input devices for the console 600.

Figure 18:
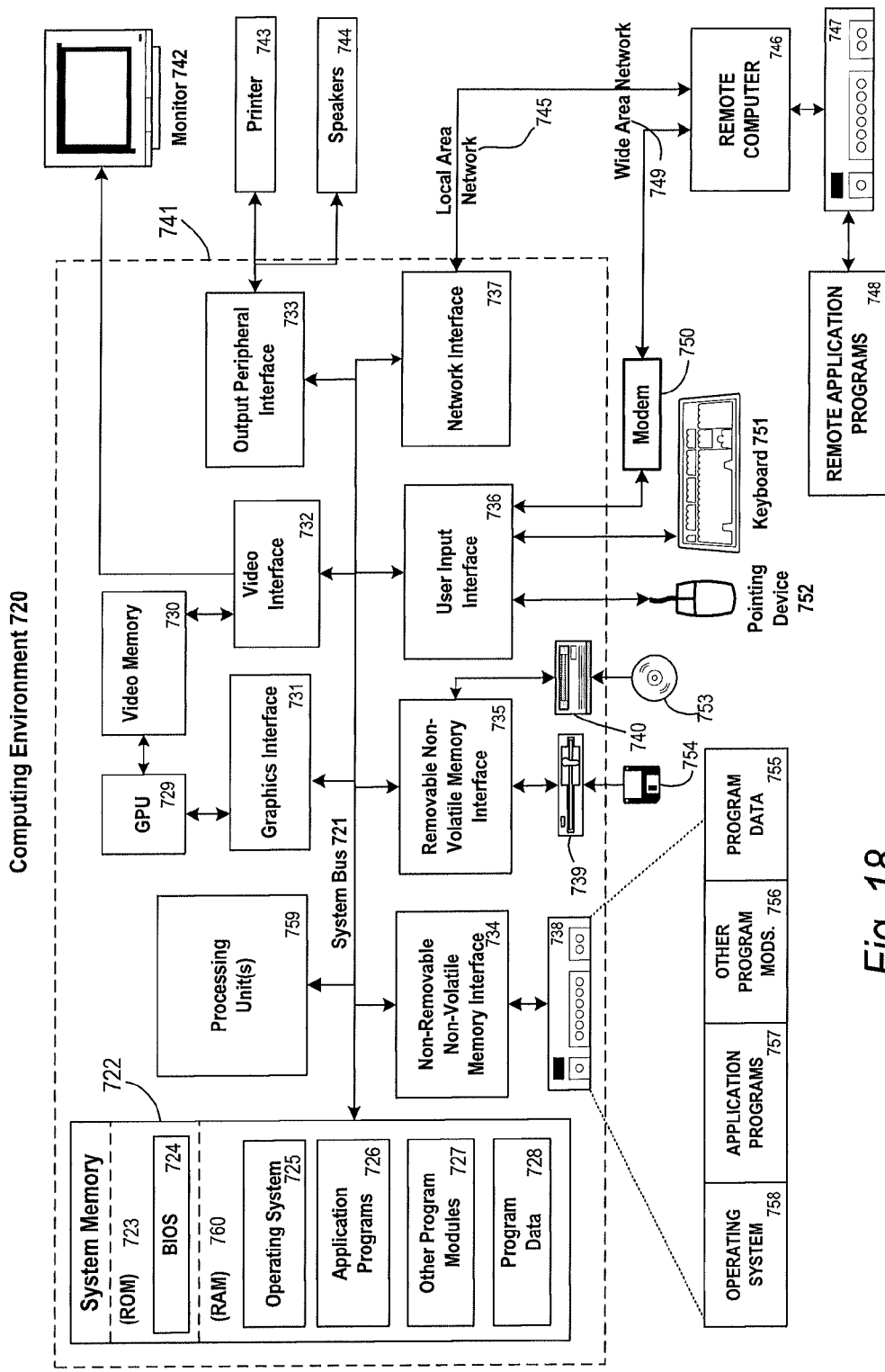
FIG. 18 is another exemplary computing environment suitable for use in the present technology.

FIG. 18 illustrates another example embodiment of a computing environment 720 that may be the computing environment 12 shown in FIGS. 3A-4 used to interpret one or more positions and motions in a target recognition, analysis, and tracking system. The computing system environment 720 is only one example of a suitable computing environment and is not intended to suggest any limitation as to the scope of use or functionality of the presently disclosed subject matter. Neither should the computing environment 720 be interpreted as having any dependency or requirement relating to any one or combination of components illustrated in the Exemplary operating environment 720. In some embodiments, the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 17, the computing environment 720 comprises a computer 741, which typically includes a variety of computer readable media. Computer readable media can be any available media that can be accessed by computer 741 and includes both volatile and nonvolatile media, removable and non-removable media. The system memory 722 includes computer storage media in the form of volatile and/or nonvolatile memory such as ROM 723 and RAM 760. A basic input/output system 724 (BIOS), containing the basic routines that help to transfer information between elements within computer 741, such as during start-up, is typically stored in ROM 723. RAM 760 typically contains data and/or program modules that are immediately accessible to and/or presently being operated on by processing unit 759. By way of example, and not limitation, FIG. 18 illustrates operating system 725, application programs 726, other program modules 727, and program data 728. FIG. 18 further includes a graphics processor unit (GPU) 729 having an associated video memory 730 for high speed and high resolution graphics processing and storage. The GPU 729 may be connected to the system bus 721 through a graphics interface 731.

The computer 741 may also include other removable/non-removable, volatile/nonvolatile computer storage media. By way of example only, FIG. 18 illustrates a hard disk drive 738 that reads from or writes to non-removable, nonvolatile magnetic media, a magnetic disk drive 739 that reads from or writes to a removable, nonvolatile magnetic disk 754, and an optical disk drive 740 that reads from or writes to a removable, nonvolatile optical disk 753 such as a CD ROM or other optical media. Other removable/non-removable, volatile/nonvolatile computer storage media that can be used in the Exemplary operating environment include, but are not limited to, magnetic tape cassettes, flash memory cards, digital versatile disks, digital video tape, solid state RAM, solid state ROM, and the like. The hard disk drive 738 is typically connected to the system bus 721 through a non-removable memory interface such as interface 734, and magnetic disk drive 739 and optical disk drive 740 are typically connected to the system bus 721 by a removable memory interface, such as interface 735.

The drives and their associated computer storage media discussed above and illustrated in FIG. 17, provide storage of computer readable instructions, data structures, program modules and other data for the computer 741. In FIG. 17, for example, hard disk drive 738 is illustrated as storing operating system 758, application programs 757, other program modules 756, and program data 755. Note that these components can either be the same as or different from operating system 725, application programs 726, other program modules 727, and program data 728. Operating system 758, application programs 757, other program modules 756, and program data 755 are given different numbers here to illustrate that, at a minimum, they are different copies. A user may enter commands and information into the computer 741 through input devices such as a keyboard 751 and a pointing device 752, commonly referred to as a mouse, trackball or touch pad. Other input devices (not shown) may include a microphone, joystick, game pad, satellite dish, scanner, or the like. These and other input devices are often connected to the processing unit 759 through a user input interface 736 that is coupled to the system bus, but may be connected by other interface and bus structures, such as a parallel port, game port or a universal serial bus (USB). The cameras 26, 28 and capture device 20 may define additional input devices for the console 700. A monitor 742 or other type of display device is also connected to the system bus 721 via an interface, such as a video interface 732. In addition to the monitor, computers may also include other peripheral output devices such as speakers 744 and printer 743, which may be connected through an output peripheral interface 733.

The computer 741 may operate in a networked environment using logical connections to one or more remote computers, such as a remote computer 746. The remote computer 746 may be a personal computer, a server, a router, a network PC, a peer device or other common network node, and typically includes many or all of the elements described above relative to the computer 741, although only a memory storage device 747 has been illustrated in FIG. 17. The logical connections depicted in FIG. 18 include a local area network (LAN) 745 and a wide area network (WAN) 749, but may also include other networks. Such networking environments are commonplace in offices, enterprise-wide computer networks, intranets and the Internet.

When used in a LAN networking environment, the computer 741 is connected to the LAN 745 through a network interface or adapter 737. When used in a WAN networking environment, the computer 741 typically includes a modem 750 or other means for establishing communications over the WAN 749, such as the Internet. The modem 750, which may be internal or external, may be connected to the system bus 721 via the user input interface 736, or other appropriate mechanism. In a networked environment, program modules depicted relative to the computer 741, or portions thereof, may be stored in the remote memory storage device. By way of example, and not limitation, FIG. 18 illustrates remote application programs 748 as residing on memory device 747. It will be appreciated that the network connections shown are Exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for verifying accuracy of a target recognition, analysis, and tracking system, comprising:
providing a searchable set of recorded and synthesized depth and associated ground truth data, the ground truth data comprising an association of target motion at a series of points, the ground truth providing a sample against which, when provided to a tracking pipeline, a deviation from which provides an error thereby determining the accuracy of the pipeline;
responsive to a request to test the pipeline, returning at least a subset of the searchable set;
receiving tracking data output from the pipeline on the at least subset of the searchable set; and
generating an analysis of the tracking data relative to the ground truth in the at least subset to provide an output of the error relative to the ground truth.

2. The method of claim 1 wherein the method further includes searching the searchable set, creating a test suite, and outputting the searchable set to a plurality of processing devices, each of the processing devices including an instance of the tracking pipeline.

3. The method of claim 2 wherein the step of generating an analysis includes detecting errors between a processed version of the depth data created by instances of the pipeline and analyzing the errors according to one or more computational metrics, the one or more computational metrics providing an indication of tracking accuracy of the pipeline.

4. The method of claim 3 wherein testing metrics measure overall progress and regression in tracking accuracy for one or more of: an entire scene, a single frame, a single subject in a frame or specific body parts of a user.

5. The method of claim 3 wherein testing metrics measure overall progress and regression in tracking accuracy for one or more of: background removal, retargeting to simulated player representations, body part classification, and detection of scene components.

6. The method of claim 1 wherein manual intervention is allowed to correct ground truth to a known good state.

7. The method of claim 1 further including creating a plurality of test data clips by associating sensor recordings with metadata to create the ground truth.

8. The method of claim 7 wherein the metadata defining testable aspects of each test data clip.

9. The method of claim 7 further including registering a motion capture coordinate space to a human tracking pipeline space prior to creating a motion capture data file.

10. The method of claim 7 further including calibrating motion capture sensors to expected ground truth joint positions after creating a test data file.

11. The method of claim 1 further including generating synthetic composite test clips by projection of a depth clip into a coordinate space of another depth clip using a computed floor plane.

12. The method of claim 11 further including a process allowing users to transform depth clips from a source depth file into a composite depth file coordinate space.

13. The method of claim 11 further including a process allowing users to load three dimensional synthetic objects into a scene, and composite them into a synthetic data clip.

14. The method of claim 11 further including a process allowing users to load sequence input clips to occur at defined times and to play for defined durations in a synthetic composite test data clips.

15. A system for verifying accuracy of a target recognition, analysis, and tracking system, comprising:
- a searchable repository of recorded and synthesized depth clips and associated ground truth for each depth clip, the ground truth comprising an association of joint positions of a human skeletal information detected in the depth clip which has been verified to be accurate;
- one or more processing devices each including at least one instance of a target recognition, analysis, and tracking pipeline;
- an analysis engine controlling providing at least a subset of the searchable set responsive to a request to test the pipeline and receiving tracking data output from the pipeline on the subset of the searchable set; and
- a report generator outputting an analysis of the tracking data relative to the ground truth in the at least subset to provide an output of the error relative to the ground truth.

16. The system of claim 15 including a plurality of processing devices each including an instance of the target recognition, analysis, and tracking pipeline.

17. The system of claim 16 wherein the analysis engine includes a job controller providing instructions implementing individual instances on each of the plurality of processing devices and outputting the subset of the searchable set to ones of the plurality of processing devices.

18. The system of claim 16 wherein the analysis engine includes one or more metrics engines providing computational analysis of errors determined between a processed subset and known ground truth for the subset.

19. The system of claim 18 further including a visualization interface outputting reports provided by the report generator to a user.

20. A method for verifying accuracy of a target recognition, analysis, and tracking system, comprising:
- recording a plurality of test data clips;
- synthesizing composite clips of test data;
- annotating the test data;
- generating ground truth for the test data;
- storing test data recorded and synthesized and associated ground truth tracking data in a searchable repository,
- responsive to a request to test a target recognition, analysis, and tracking system, returning at least a subset of the searchable set;
- outputting the subset and code for processing the subset to one or more processing devices, the devices process the subset to provide skeletal tracking information using a pipeline;
- receiving tracking data information from the devices;
- generating an analysis of the tracking data in the subset relative to the ground truth in the at least subset to provide an output of the error relative to the ground truth; and
- creating a summary report of the analysis providing a representation of whether the pipeline performed better than previous versions of the pipeline.

* * * * *